(12) United States Patent
Jessop et al.

(10) Patent No.: US 12,533,220 B2
(45) Date of Patent: Jan. 27, 2026

(54) DENTAL CARE DEVICE

(71) Applicant: Ultradent Products, Inc., South Jordan, UT (US)

(72) Inventors: Neil Thomas Jessop, Sandy, UT (US); Lynn William Peaslee, Syracuse, UT (US)

(73) Assignee: ULTRADENT PRODUCTS, INC., South Jordan, UT (US)

( * ) Notice: Subject to any disclaimer, the term of this patent is extended or adjusted under 35 U.S.C. 154(b) by 562 days.

(21) Appl. No.: 17/808,152

(22) Filed: Jun. 22, 2022

(65) Prior Publication Data

US 2022/0401201 A1 Dec. 22, 2022

Related U.S. Application Data

(60) Provisional application No. 63/213,615, filed on Jun. 22, 2021.

(51) Int. Cl.
*A61C 13/15* (2006.01)
*A61C 19/04* (2006.01)

(52) U.S. Cl.
CPC ............ *A61C 19/004* (2013.01); *A61C 19/04* (2013.01)

(58) Field of Classification Search
CPC ............................... A61C 19/004; A61C 19/04
See application file for complete search history.

(56) References Cited

U.S. PATENT DOCUMENTS

| | | | |
|---|---|---|---|
| 6,099,141 A | 8/2000 | Landamia | |
| 8,610,372 B2 | 12/2013 | Rothschild | |
| 9,512,991 B2 | 12/2016 | Maglica et al. | |
| 9,769,906 B2 | 9/2017 | Newton et al. | |

(Continued)

FOREIGN PATENT DOCUMENTS

| | | |
|---|---|---|
| CN | 104469018 A | 3/2015 |
| CN | 206741982 U | 12/2017 |

(Continued)

OTHER PUBLICATIONS

Examination Report for Australian Application No. 2022298779 mailed May 12, 2025, 3 pgs.

(Continued)

*Primary Examiner* — Eric J Rosen
*Assistant Examiner* — Hao D Mai
(74) *Attorney, Agent, or Firm* — Maschoff Brennan

(57) ABSTRACT

A dental care device may include a light emitting device configured to emit light according to a selected function of multiple functions of operation. The dental care device may also include a sensor configured to output movement signals representing movement of the dental care device and at least one processor. The processor may be configured to perform operations including determine a first movement of the dental care device based on the movement signals and in response to the first movement of the dental care device and in response to the light emitting device having a first status, direct a change in a function of operation of the light emitting device. The operations may also include in response to the first movement of the dental care device and in response to the light emitting device having a second status, direct a change in a status of the light emitting device.

15 Claims, 15 Drawing Sheets

(56) References Cited

U.S. PATENT DOCUMENTS

| | | |
|---|---|---|
| 9,879,846 B2 | 1/2018 | Rodriguez et al. |
| 10,610,008 B2 | 4/2020 | Wagner et al. |
| 10,958,777 B1 | 3/2021 | Finimundi et al. |
| 2008/0272928 A1 | 11/2008 | Shuster |
| 2009/0261737 A1 | 10/2009 | Wright et al. |
| 2012/0257390 A1* | 10/2012 | Fowler ............... A61C 19/004 |
| | | 362/249.02 |
| 2015/0374454 A1 | 12/2015 | Beerstecher |
| 2016/0286948 A1 | 10/2016 | Amron |
| 2016/0287364 A1 | 10/2016 | Pauler et al. |
| 2019/0046812 A1 | 2/2019 | Harlan et al. |
| 2020/0030070 A1* | 1/2020 | Gerlach ............... G03B 15/03 |

FOREIGN PATENT DOCUMENTS

| | | |
|---|---|---|
| CN | 109831570 A | 5/2019 |
| DE | 102014112265 A1 | 3/2016 |
| DE | 102018120452 A1 | 2/2020 |
| EP | 2964141 B1 | 9/2018 |
| FR | 3044889 A1 | 6/2017 |
| GB | 2511554 A | 9/2014 |
| JP | 2019536553 A | 12/2019 |
| JP | 2021086682 A | 6/2021 |
| KR | 101352977 A | 12/2013 |
| WO | 2018/148143 A1 | 8/2018 |

OTHER PUBLICATIONS

International Search Report and Written Opinion mailed Oct. 12, 2022, in PCT Application No. PCT/US2022/034547.

* cited by examiner

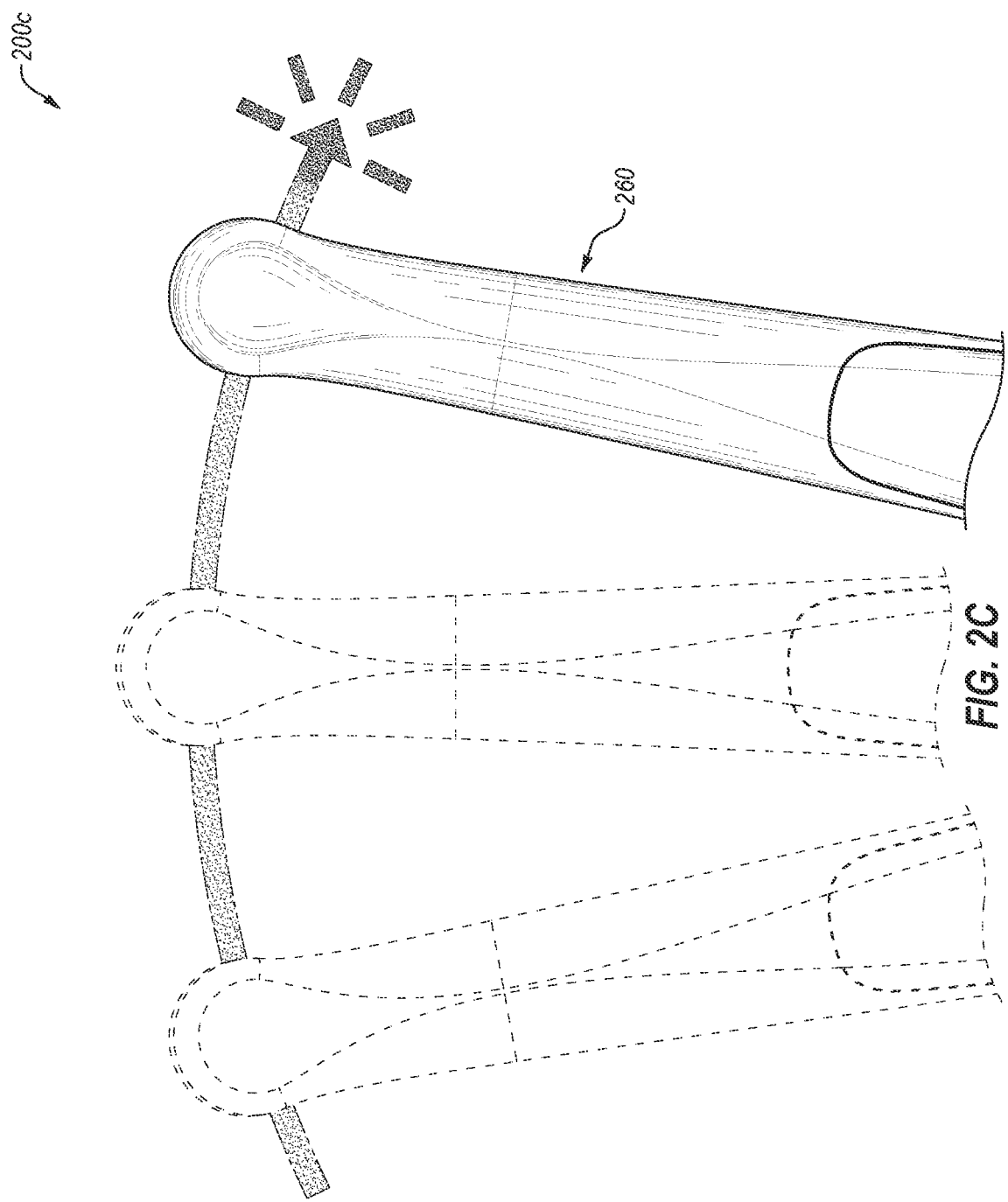

DENTAL CARE DEVICE

CROSS-REFERENCE TO RELATED APPLICATION

This application claims priority to U.S. Provisional Patent Application No. 63/213,615 filed Jun. 22, 2021, the disclosure of which is hereby incorporated herein by this reference in its entirety.

FIELD

The embodiments discussed in the present disclosure are related to a dental care device.

BACKGROUND

Light cured polymeric materials are widely used in the field of dentistry for adhesion, sealing and restoration, and may be cured or hardened upon exposure to a source of radiation. Such photoactive materials are cured generally when exposed to a specific radiation spectrum depending on the type of photo activator being used. In some circumstances, photocurable dental materials are a convenience to the dentist as curing processes can be initiated when desired.

The subject matter claimed herein is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, a dental care device may include a light emitting device configured to emit light according to a selected function of multiple functions of operation. The light emitted by the light emitting device may be different for each of the multiple functions of operation and the multiple functions of operation may be configured for dental care of a patient. The dental care device may also include a sensor configured to output movement signals representing movement of the dental care device and at least one processor communicatively coupled to the sensor and the light emitting device. The processor may be configured to perform operations. The operations may include determine a first movement of the dental care device based on the movement signals and in response to the first movement of the dental care device and in response to the light emitting device having a first status, direct a change in a function of operation of the light emitting device. The operations may also include in response to the first movement of the dental care device and in response to the light emitting device having a second status, direct a change in a status of the light emitting device.

BRIEF DESCRIPTION OF THE DRAWINGS

Example embodiments will be described and explained with additional specificity and detail through the use of the accompanying drawings in which:

FIGS. 2A-2C illustrate diagrams of example movements of a dental care device;

DESCRIPTION OF EMBODIMENTS

Figure 1:
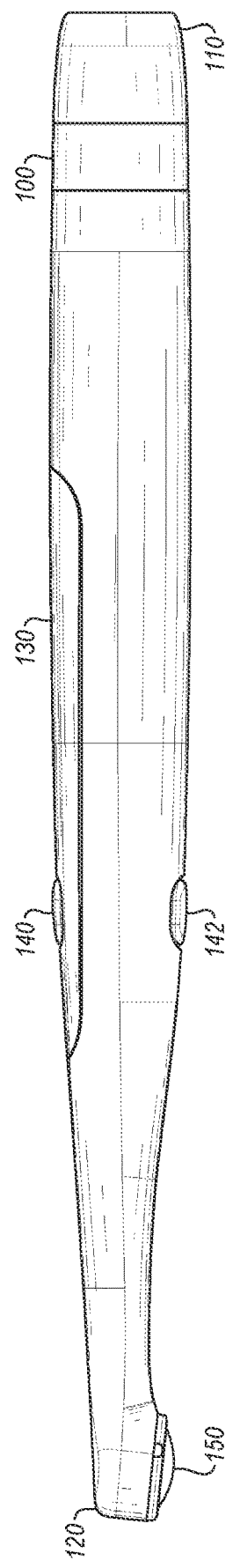
FIG. 1 illustrates an example dental care device.

Some embodiments in this disclosure relate to a dental care device that may include multiple different functions of operations. For example, the dental care device may include a function of operation that may be configured to emit light to cure a photocurable dental material, referred to as a curing function. As another example, the dental care device may include another function of operation that may be configured to emit light configured for inspection an oval cavity of a patient, including the teeth, gums, tongue, or other parts of the oral cavity of a patient, referred to as a diagnosis function.

In some embodiments, the dental care device may include multiple modes of operations for each function. For example, the different modes of operation for the curing function may include different intensities of light and/or different durations of light emission. The different modes of operation of the diagnosis function may include emission of different wavelengths of light, such as a white light, black light, or some other wavelength of light.

In some embodiments, the dental care device may be configured to respond to user input to start or stop light emission, change a function of operation, and/or change a mode of operation of a particular function. The user input may be obtained by the dental care device based on movement of the dental care device by a user or user interaction with one or more buttons of the dental care device. For example, a user waving the dental care device side-to-side may cause the dental care device to change between different modes of the diagnosis function. Alternately or additionally, a user waving the dental care device up and down in a drum tap fashion may cause the dental care device to change between different modes of the curing function.

In some embodiments, the same user input may result in a different response by the dental care device based on a status of the dental care device. For example, in response to the dental care device emitting light for the diagnosis function, waving the dental care device back and forth may result in the dental care device stopping the emission of light. In these and other embodiments, in response to the dental care device not emitting light, waving the dental care device back and forth may result in the dental care device changing a mode of the diagnosis function.

In some embodiments, the dental care device may further include a visual indicator that indicates a current function and status of the dental care device. For example, the visual indicator be different colors for different modes and/or functions. As another example, the visual indicator may have different light emission patterns for different modes and/or functions. For example, when the dental care device is emitting light, the visual indicator may have a first color and/or light emission pattern that is different than when the dental care device is not emitting light.

In some embodiments, the dental care device may be configured to broadcast a sound corresponding to changes in the status of the dental care device. For example, when the dental care device begins to emit light, the dental care device may broadcast a first sound that increase in pitch and when the dental care device stops emission of light, the dental care device may broadcast a second sound that decreases in pitch.

Turning to the figures, FIG. 1 illustrates an example dental care device 100. The dental care device 100 may be arranged in accordance with at least one embodiment described in the present disclosure. The dental care device 100 may include a first end 110 and a second end 120. A middle section 130 may extend between the first end 110 and the second end 120. The first end 110 and a portion of the middle section 130 may have a cylindrical shape. The cylindrical shape may be size and configured for gripping of an operator of the dental care device 100.

In some embodiments, the dental care device 100 may be configured to be battery powered. The dental care device 100 when configured to be battery powered may include a shape as illustrated in FIG. 1. In these and other embodiments, a battery may be housed in the first end 110. Alternately or additionally, the dental care device 100 may be powered by an external power source. In these and other embodiments, the first end 110 of the dental care device 100 may be configured with a cord to couple the dental care device 100 to the external power source.

The second end 120 of the dental care device 100 may include a lens 150 and a light emitting device housed within the dental care device 100 next to the lens 150. The lens 150 may be configured to pass light and the light emitting device may be configured to emit light that may pass through the lens 150. The light may be generated by a light source within the dental care device 100 such as light emitting diodes (LEDs). The light may be emitted in a direction away from the surface of the lens 150. In some embodiments, the lens 150 may be removably attached to the dental care device 100. In these and other embodiments, different lens may be attached to the dental care device 100 for different operations of the dental care device 100.

In some embodiments, the second end 120 of the dental care device 100 may be sized and configured to be placed within an oral cavity of a patient. For example, the second end 120 may include a cylindrical shape. The cylindrical shape of the second end 120 may include a central internal axis that runs along the cylindrical shape parallel to a direction of emission light through the lens 150.

In some embodiments, the central internal axis of the second end 120 may be substantially perpendicular to a central internal axis of the first end 110. In these and other embodiments, the central internal axis of the second end 120 may form an angle of between 60 degrees and 90 degrees with the central internal axis of the first end 110. For example, the angle may be 60, 65, 70, 75, 80, 85, or 90 degrees or some angle therebetween.

In these and other embodiments, the second end 120 may be smaller than the first end 110. For example, the second end 120 may have a smaller width, length, and/or depth than the first end 110. In these and other embodiments, the middle section 130 may taper as the middle section 130 approaches the second end 120. In these and other embodiments, a portion of the middle section 130 approximate to the second end 120 may be smaller in width, length, and/or depth than the second end 120.

As the middle section 130 begins to taper, the dental care device 100 may include a first input device 140 and a second input device 142. The first input device 140 may include a button and may be positioned on a first side of the dental care device 100 that is opposite a second side from which light is emitted through the lens 150. The second input device 142 may include a button and may be positioned on the second side of the dental care device 100.

In some embodiments, the dental care device 100 may include multiple different functions of operation with respect to emission of light by the light emitting device. In these and other embodiments, the wavelength of light, an intensity of light, a temperature of light, and/or duration of the emission of light may be different for each of the functions. In these and other embodiments, each of the functions of operation of the dental care device 100 may be configured for dental care of a patient.

In some embodiments, some of the functions of operation may be curing functions. A curing function may be configured to emit light to cure a photocurable dental material. For example, during dental care of a patient an amount of photocurable filling material may be placed in a tooth cavity. The lens 150 may be positioned adjacent to the photocurable filling material. Light may be emitted by the dental care device 100 to initiate polymerization and subsequent curing of the photocurable filling material in the tooth cavity.

In some embodiments, the light emitted during a curing function may include wavelengths between 300 and 600 nanometers. Alternately or additionally, the range of the wavelength of light may be between 350 and 550 nanometers. In these and other embodiments, the light may include one or more peak intensities. For example, the light may include a peak intensity in a range of 380 to 400 nanometers, 425 to 480 nanometers, or some combination thereof.

The dental care device 100 may include multiple curing functions. The different curing functions may be referred to in this disclosure as curing modes. However, a mode of a function may be a function and is referred to as a mode solely for ease of explanation. The curing modes may differ based on wavelength of light, an intensity of light, and/or a duration of emission of light. In some embodiments, one or more different light sources (e.g., LEDs) and/or lenses may be used for different curing modes.

In some embodiments, some of the functions of operation may be diagnosis functions. A diagnosis function may be configured to emit light to assist in diagnosis of conditions within an oral cavity or inspection of the oral cavity. For example, during dental care of a patient, an inspection of the oral cavity may be performed to ascertain a condition of the gums, teeth, or other aspects of the oral cavity. The inspection of the oral cavity may result in a diagnosis regarding the gum, teeth, or another aspect of the oral cavity.

In some embodiments, the light emitted during a diagnosis function may include wavelengths less than 500 nanometers. Alternately or additionally, the range of the wavelength of light may be less than 420 nanometers. Alternately or additionally, the range of the wavelength of light may include light of the visible spectrum. For example, different temperatures of the visible spectrum may be used, including temperatures between 2000 degrees kelvin and 7000 degrees kelvin.

The dental care device 100 may include multiple diagnosis functions. The different diagnosis functions may be referred to in this disclosure as diagnosis modes. However, a diagnosis mode may be a function and is referred to as a mode solely for ease of explanation. The diagnosis modes may differ based on wavelength of light, a temperature of light, an intensity of light, and/or a duration of emission of light. In some embodiments, one or more different light sources and/or lenses may be used for different diagnosis modes.

In some embodiments, user input obtained through the first input device 140 and the second input device 142 may be configured to change a status, a function of operation, and/or a mode of a function of operation of the dental care device 100. In these and other embodiments, the status of the dental care device 100 may describe whether the dental care device 100 is emitting or not emitting light. For example, the dental care device 100 when emitting light may have a first status, such as a light status. The dental care device 100 when not emitting light may have a second status, such as a dark status.

In some embodiments, with a light status, input obtained from the first input device 140 and/or the second input device 142 may result in the status of the dental care device 100 changing to the dark status by the dental care device 100 stopping the emission of light.

In some embodiments, with a dark status, input obtained from the first input device 140 and/or the second input device 142 may result in the status of the dental care device 100 changing to the light status by the dental care device 100 starting to emit light. Alternately or additionally, input obtained from the first input device 140 and/or the second input device 142 may result in the status of the dental care device 100 maintaining as the dark status and a function or mode of operation of the dental care device 100 changing. Alternately or additionally, input obtained from the first input device 140 and/or the second input device 142 may result in the dental care device 100 entering or exiting a sleep mode. In these and other embodiments, input obtained from the first input device 140 and/or the second input device 142 may result in different operations being performed by the dental care device 100 based on a status of the dental care device 100.

In some embodiments, user input may be obtained by a movement sensor within the dental care device 100. For example, the movement sensor may obtain a movement of the dental care device 100 as produced by a user of the dental care device 100. Particular movements of the dental care device 100 may be detected by the movement sensor and recognized as movements associated with a user input. The user inputs resulting from the movements may be configured to change a status, a function of operation, and/or a mode of a function of operation of the dental care device 100.

In some embodiments, with a light status, one or more movements of the dental care device 100 may result in the status of the dental care device 100 changing to the dark status by the dental care device 100 stopping the emission of light.

In some embodiments, with a dark status, one or more movements of the dental care device 100 may result in the status of the dental care device 100 maintaining as the dark status and a function and/or mode of operation of the dental care device 100 changing. In these and other embodiments, some movements may result in different operations being performed by the dental care device 100 based on a status of the dental care device 100. For example, with a light status and a first function operation, a first movement and a second movement of the dental care device 100 may change the status of the dental care device 100 to a dark status. As another example, with a light status and a second function operation, a first movement and a second movement of the dental care device 100 may not change the status of the dental care device 100 such that the light status of the dental care device 100 is maintained. Alternately or additionally, with a dark status, a first movement of the dental care device 100 may change function operation of the dental care device 100 to a first function operation and/or a mode of the first function operation. In these and other embodiments, with a dark status, a second movement of the dental care device 100 may change function operation of the dental care device 100 to a second function operation and/or a mode of the second function operation.

In some embodiments, the dental care device 100 may include a visual indicator. For example, the button 140 may change colors or change an illumination pattern, such as changing between solid and flashing in the same color, or changing between colors, to indicate a state of the dental care device. In these and other embodiments, the visual indicator may visually indicate a status and a function and/or mode of operation of the dental care device 100. For example, for each of the different modes of operation, the dental care device 100 may present a different visual indication. For example, for the first mode of the first function the visual indication may be a solid first color and for the second mode of the first function the visual indication may be a solid second color. As another example, for a first mode of the second function the visual indication may be a third color without flashing and for the second mode of the second function the visual indication may be the third color with flashing.

As another example, the dental care device 100 may present a different visual indication based on the state of the dental care device 100. In these and other embodiments, the visual indicator may have a unique color and/or illumination pattern when the dental care device 100 has a light status and is emitting light. When the dental care device 100 is not emitting light and has a dark status, the visual indicator may include an indication of the function and/or mode of operation of the dental care device 100.

In some embodiments, the visual indicator may be positioned on the dental care device 100 such that the visual indicator may be viewed when the dental care device 100 is in use such as when the second end 120 is located in the oral cavity of a patient. As such, an operator of the dental care device 100 may ascertain a state of the dental care device 100 while the dental care device 100 is in use without having to remove the dental care device 100 from the oral cavity of the patient.

In some embodiments, the dental care device 100 may be configured to broadcast an audio indication when a state of the dental care device 100 changes. The state of the dental care device 100 may change when there is a change in a status, a function of operation, and/or a mode of a function of operation of the dental care device 100. In some embodiments, a different audio indication may be associated with each different state of the dental care device 100. The audio indications may differ in intensity, pitch, and/or pattern.

As an example, when the dental care device 100 changes to a light status, a first audio indication may be broadcast and when the dental care device 100 changes to a dark status a second audio indication may be broadcast. In some embodiments, the first audio indication, when the dental care device 100 changes to a light status, may include a change in the pitch of the audio indication. For example, when the dental care device 100 changes to a light status the pitch of the audio indication may increase and when the dental care device 100 changes to a dark status the pitch of the audio indication may decrease. The audio indication may provide another way for a user of the dental care device 100 to ensure that a selected state of the dental care device 100 is a desired state of the dental care device 100. As such, the audio indication may provide a measure of safety that helps a user to avoid placing the dental care device 100 in an unwanted state or maintain the dental care device in an unwanted state.

Modifications, additions, or omissions may be made to the dental care device 100 without departing from the scope of the present disclosure. For example, in some embodiments, the dental care device 100 may not include the second input device 142. Alternately or additionally, the first input device 140 and the second input device 142 may be located at different positions along the dental care device 100. As another example, the shape of the dental care device 100 may be different than that described or illustrated in this disclosure.

Figure 2A:
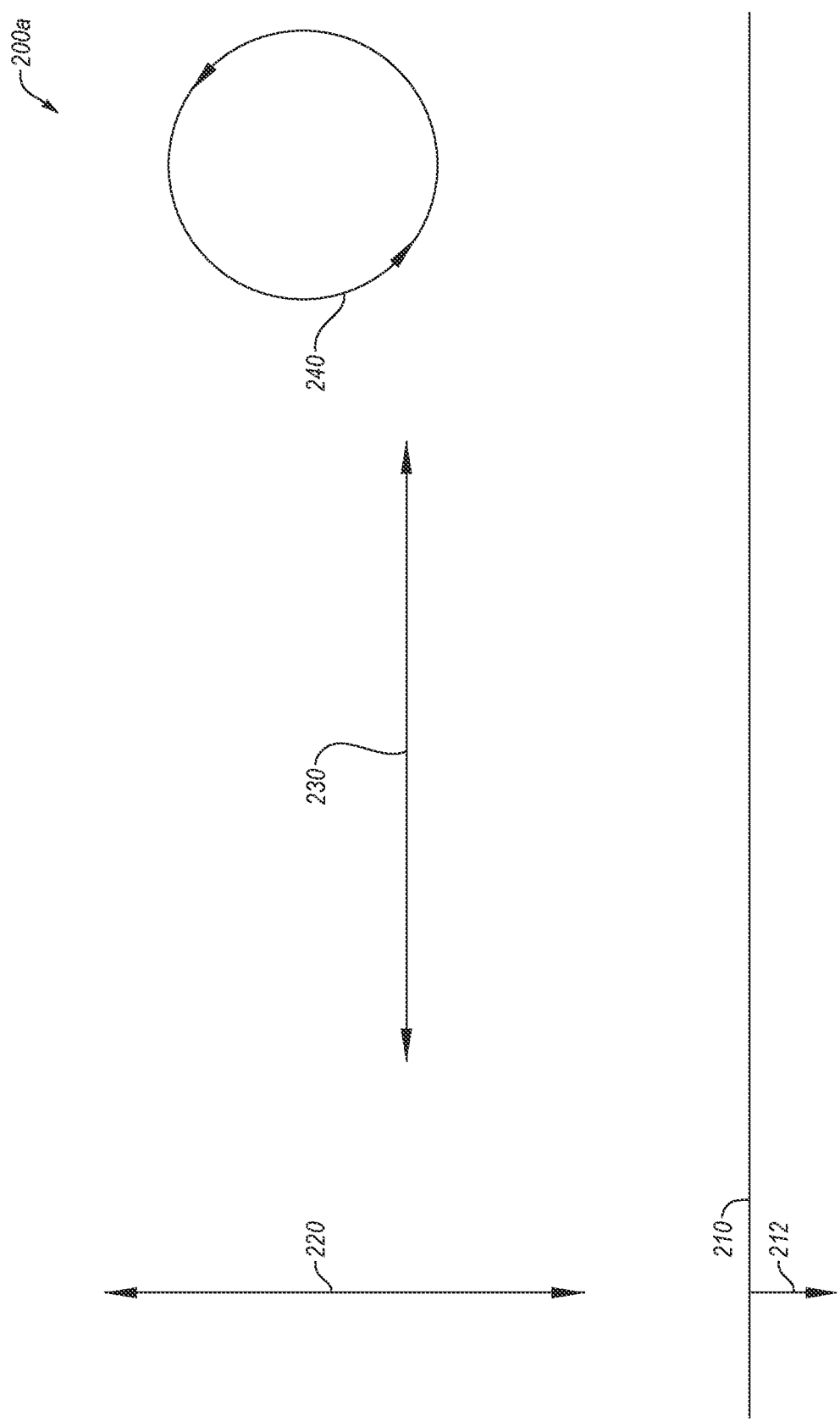
Figure 2B:
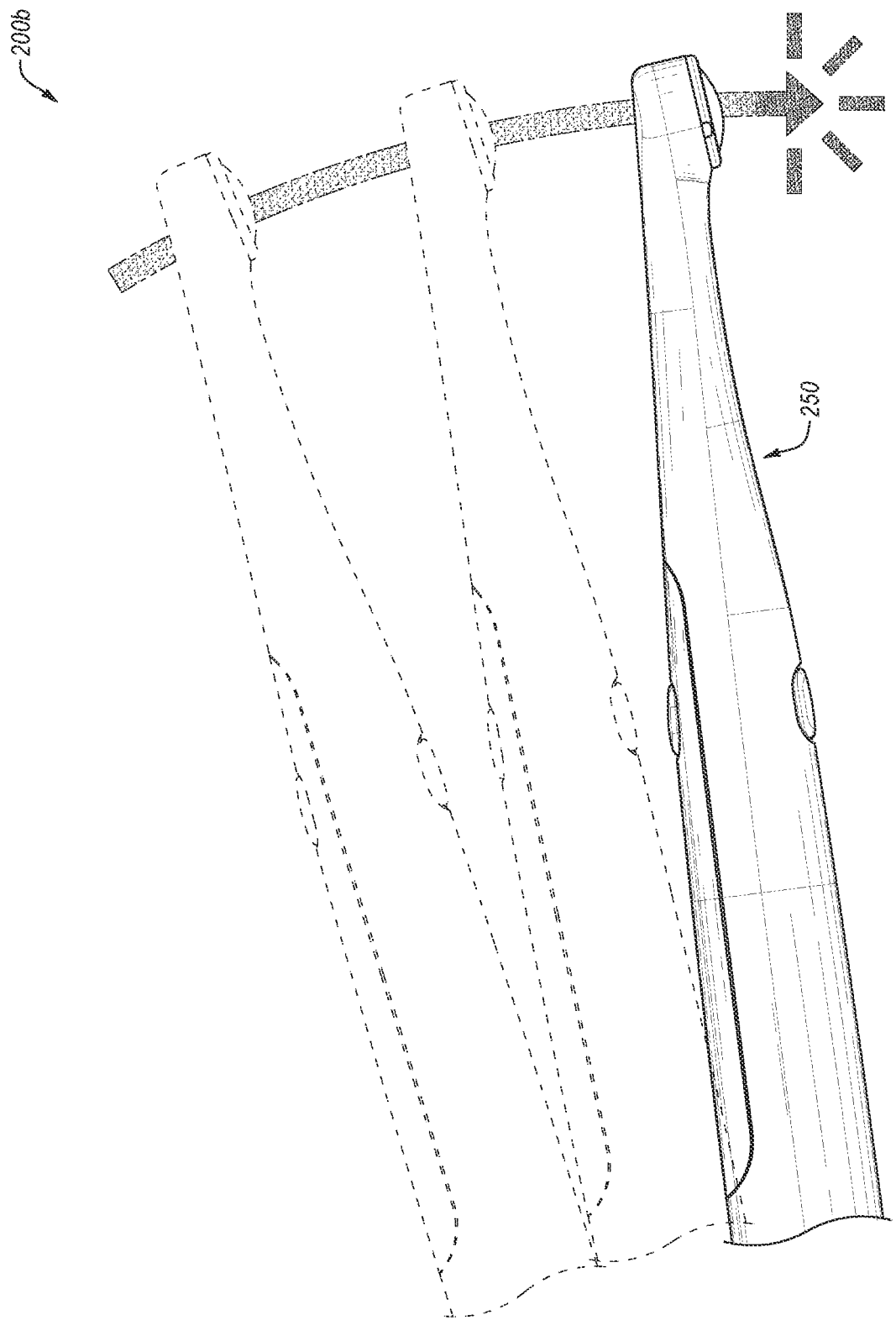

FIGS. 2A-2C illustrate diagrams 200a, 200b, and 200c that illustrates example movements of a dental care device. The diagram 200 may be arranged in accordance with at least one embodiment described in the present disclosure. The diagram 200 may illustrate the ground 210, a direction of a gravitational force 212 of the earth, a first path 220, a second path 230, and a third path 240.

Movement of a dental care device, such as the dental care device 100 of FIG. 1, along the first path 220, the second path 230, and/or the third path 240 may be examples of movements of a dental care device that may recognized as movements associated with user input for the dental care device.

The direction of the first path 220 may be parallel or substantially parallel to the gravitational force 212 of the earth and perpendicular or substantially perpendicular to the ground 210. The first path 220 may include one or more movements along the first path 220. For example, a movement along the first path 220 may begin at a first location of the first path 220 that is nearest to the ground 210 and travel to a second location further from the ground 210 along the first path 220. An example of the first path 220 is illustrated by the dental care device 250 in the diagram 200b of FIG. 2B. As illustrated in FIG. 2B, the first path 220 may be analogous to a drum tap movement where the dental care device 250 moves forward in the air.

The direction of the second path 230 may be parallel or substantially parallel to the ground 210 and perpendicular or substantially perpendicular to the gravitational force 212 of the earth. The second path 230 may include movements along the second path 230. For example, a movement along the second path 230 may begin at a first location along the second path 230 and travel to a second location along the second path 230. An example of the second path 230 is illustrated by the dental care device 260 in the diagram 200c of FIG. 2C. As illustrated in FIG. 2C, the second path 230 may be analogous to a waving motion where the dental care device 250 moves in a side-ways motion in the air.

The direction of the third path 240 may be a circular path where the distance between the dental care device and the ground 210 changes along the third path 240. The third path 240 may include one or more oscillations along the third path 240. For example, an oscillation along the third path 240 may begin at a first location along the third path 240 and traverse the third path 240 back to the first location.

Modifications, additions, or omissions may be made to the diagram 200 without departing from the scope of the present disclosure. For example, other paths may be recognized as movements associated with user input for a dental care device. For example, a path that traverses diagonal to the ground 210 may be recognized as movements associated with user input for a dental care device.

Alternately or additionally, paths that may be recognized as movements associated with user input for a dental care device may be based on an orientation of a movement capture device, such as an accelerometer or other device, within the dental care device. The movement capture device may be configured to register movement of the dental care device. For example, a path that may be recognized as movements associated with user input may be associated with an axis of the movement capture device. For example, the movement illustrated in FIG. 2B may be associated with the y-axis of the movement capture device when the dental care device is oriented as illustrated in FIG. 2B. Thus, the orientation of the dental care device may change the movement captured by the movement capture device. For example, rotating the orientation of the dental care device ninety degrees from the orientation illustrated in FIG. 2B could cause the y-axis of the movement capture device to rotate. As such, a movement as illustrated in FIG. 2C may be registered as a movement in the z-axis of the movement capture device.

In some embodiments, as described above, the movement illustrated in FIG. 2B may be associated with the y-axis of the movement capture device when the dental care device is oriented as illustrated in FIGS. 2B and 2C. In these and other embodiments, the movement illustrated in FIG. 2C may be associated with the x-axis of the movement capture device when the dental care device is oriented as illustrated in FIGS. 2B and 2C.

In some embodiments, particular criteria may be meet before paths may be recognized as movements associated with user input for a dental care device. For example, a movement capture device may capture movement of the dental care device. Any movements along an axis that is not associated with a path may be ignored. Alternately or additionally, any movements along an axis associated with a path that does not have a directional force that satisfies one or more particular threshold may be ignored as well.

In some embodiments, in addition to a movement along an axis associated with a path that has a first force that satisfies a first threshold, to recognize the movement as user input, the movement may have a second force that satisfies a second threshold and the second force may be opposite the first force. For example, the movement may include a first force, e.g., an acceleration in an x direction and the second force, e.g., a deceleration in the x direction.

In these and other embodiments, to recognize a movement as a user input, the second force may occur within a particular time interval of the first force. Thus, if the second force, which would otherwise meet the criteria for movement to be recognize as user input, occurs outside of the particular time interval from the occurrence of the first force, the dental care device may not recognize the movement that includes the first and second forces as a user input.

Figure 2D:
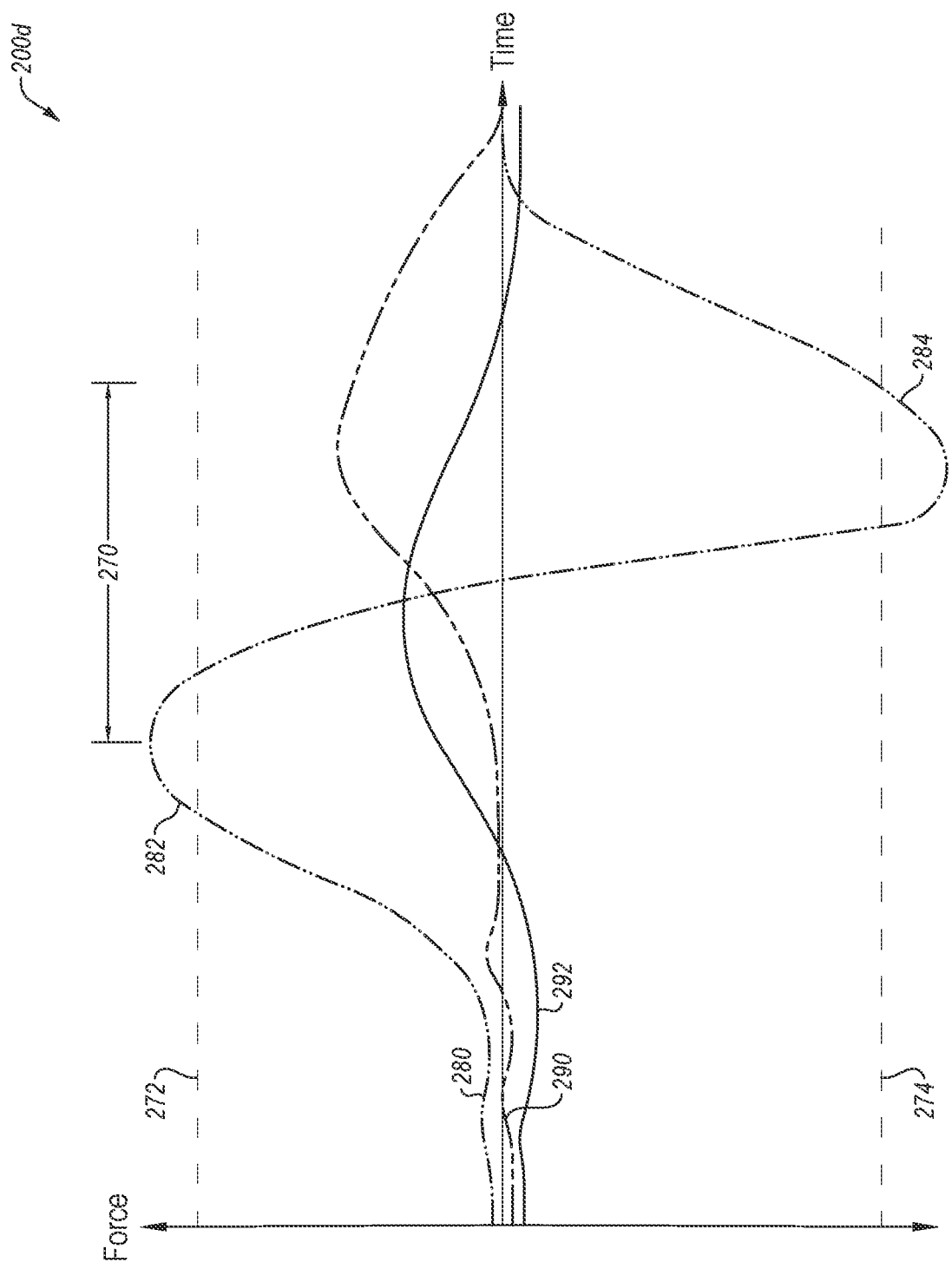
FIG. 2D illustrates a diagram with forces sensed by movement of the dental care device.

For example, FIG. 2D illustrates a diagram 200d with forces sensed by a movement of a dental care device that illustrates how first and second forces of a movement may satisfy first and second thresholds within a particular time interview. The diagram 200d may be arranged in accordance with at least one embodiment described in the present disclosure. The diagram 200d may illustrate the particular criteria that may be meet before paths may be recognized as movements associated with user input for a dental care device.

For example, the diagram 200d may include a force axis, a time axis, a time interval 270, a first force threshold 272, and a second force threshold 274. The diagram 200d may further illustrate three force signals, a first force signal 280, a second force signal 290, and a third force signal 292 that may be output by a sensor, such as an accelerometer. Each of the force signals may correspond to a sensing axis of the accelerometer.

As an example, the second force signal 290 and the third force signal 292 may each be associated with an axis that is not associated with a path. As a result, the second force signal 290 and the third force signal 292 may be ignored. The first force signal 280 may be associated with an axis that is associated with a path. Furthermore, the first force signal 280 may have a first peak 282 that satisfies the first force threshold 272 and a second peak 284 that satisfies the second force threshold 274. Alternately or additionally, the first peak 282 and the second peak 284 may occur within the time interval 270. For example, the time interval 270 may be between 10 and 30 milliseconds, such as 22, 23, 24, 26, or 28 milliseconds. Thus, a movement that results in the first force signal 280 may be recognized as a movement associated with user input by a dental care device.

As an example, the first force signal 280 may describe a tap movement as illustrated in FIG. 2B. For example, a user may accelerate the dental care device 250 starting at the top position to move the dental care device 250 toward the bottom position. The force caused by the acceleration of moving from the top position may results in the portion of the first force signal 280 before the first peak 282 and including the first peak 282. As the dental care device 250 approaches the bottom position, the user may decelerate the dental care device 250 to stop the dental care device 250 at the bottom position. The force caused by the deceleration to stop at the bottom position may results in the portion of the first force signal 280 after the first peak 282 and including the second peak 284. Note that the force caused by the deceleration is opposite the force caused by the acceleration. Thus a movement of the dental care device 250 in a single direction may be recognized as a user input by the dental care device 250. The dental care device 250 may not require movement in a first direction and second direction, such as a back-and-forth movement, to be recognized as a user input by the dental care device 250.

In some embodiments, in addition to a first movement along an axis associated with a path that has a directional force that satisfies a particular threshold, to recognize movements as user input, a second movement in the axis with a directional force that satisfies the particular threshold and that is in the opposite direction of the first movement may occur. For example, the first movement may be in the positive z direction and the second movement may be in the negative z direction.

In these and other embodiments, to recognize movements as user input, the second movement may occur within a particular time interval of the first movement. Thus, if the second movement, which would otherwise meet the criteria for movement to be recognize as user input, occurs outside of the particular time interval from the occurrence of the first movement, the dental care device may not recognize the first and second movement as an user input.

For example, a first movement may be captured by the movement capture device in the positive x direction that exceeds the particular threshold. A second movement may be captured by the movement capture device in the negative x direction that exceeds the particular threshold. The second movement may occur within a particular time interval of the first movement. As a result, the dental care device may register the first and second movements of the dental care device as a user input and perform the associated function as discussed in this disclosure.

As another example, the first movement may be captured by the movement capture device in the positive z direction that exceeds the particular threshold. A second movement may be captured by the movement capture device in the negative z direction that exceeds the particular threshold. The second movement may not occur within a particular time interval of the first movement. As such, no user input may be associated with the movement of the dental care device.

As another example, the first movement may be captured by the movement capture device in the positive z direction that exceeds the particular threshold. A second movement, which may occur within a particular time interval of the first movement, may be captured by the movement capture device in the negative z direction that does not exceed the particular threshold. As such, no user input may be associated with the movement of the dental care device.

Figure 3:
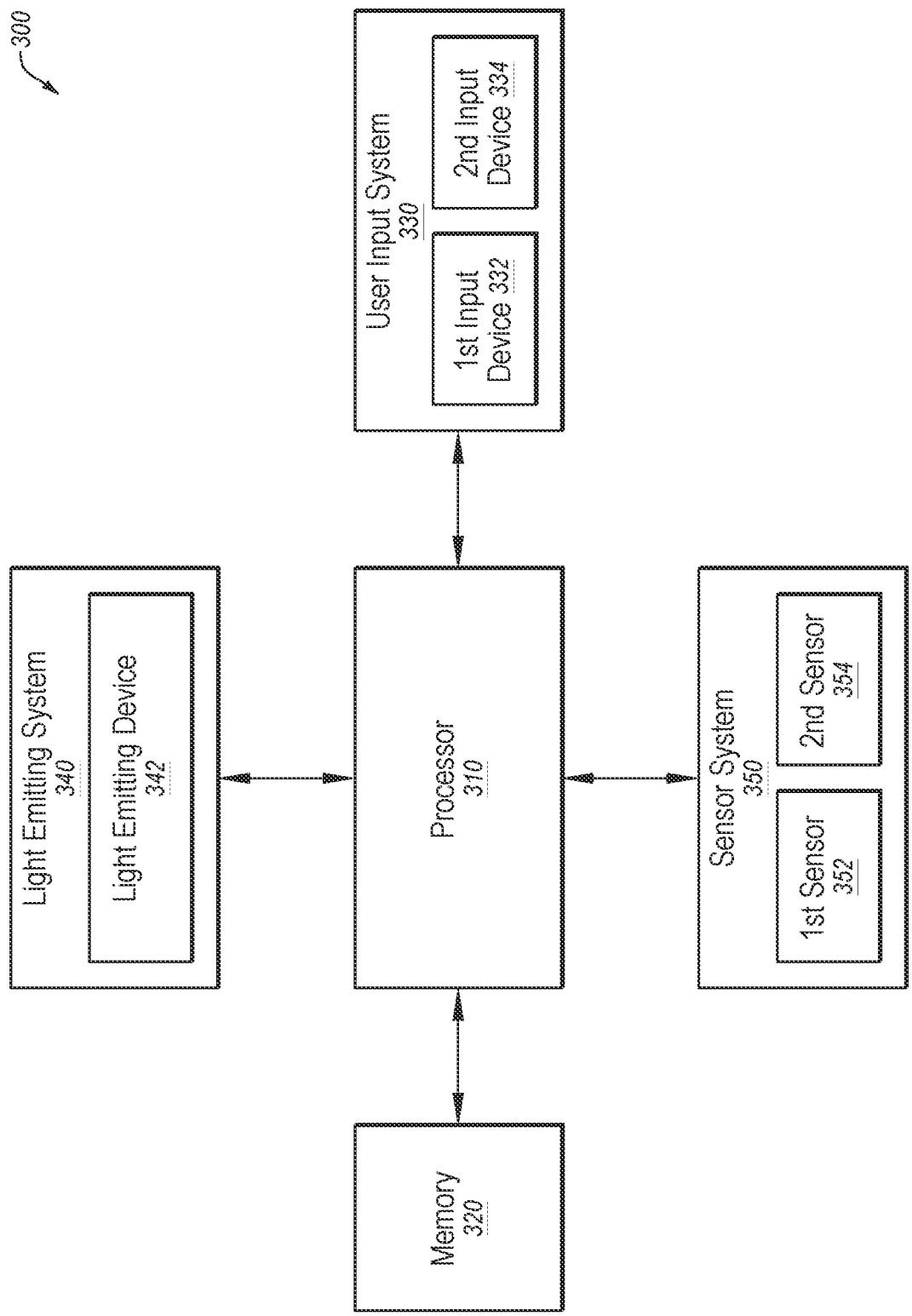
FIG. 3 illustrates a block diagram of an example dental care device.

FIG. 3 illustrates a block diagram of an example dental care device 300. The dental care device 300 may be arranged in accordance with at least one embodiment described in the present disclosure. The dental care device 300 may include a processor 310, a memory 320, a user input system 330, a light emitting system 340, and a sensor system 350.

Generally, the processor 310 may include any suitable special-purpose or general-purpose computer, computing entity, or processing device including various computer hardware or software modules and may be configured to execute instructions stored on any applicable computer-readable storage media. For example, the processor 310 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 3, it is understood that the processor 310 may include any number of processors that are configured to perform individually or collectively any number of operations described herein. In some embodiments, the processor 310 may interpret and/or execute program instructions and/or process data stored in the memory 320. In some embodiments, the processor 310 may execute the program instructions stored in the memory 320.

For example, in some embodiments, the processor 310 may execute program instructions stored in the memory 320 that are related to curing functions or diagnosis functions that the dental care device 300 may perform as directed by the instructions. In these and other embodiments, the instructions may be used to perform one or more operations of operations 400 or methods 500, or 600 of FIGS. 4, 5, and 6.

The memory 320 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 310.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 310 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuuten, 500 F.3d 1346 (Fed. Cir. 2007). Combinations of the above may also be included within the scope of computer-readable media.

In some embodiments, the user input system 330 may include any device to allow a user to interface with the dental care device 300. For example, the user input system 330 may include a first input device 332 and a second input device 334. The first input device 332 may be a button or some other type of input device. The first input device 332 may provide a signal to the processor 310 in response to interaction of a user with the first input device 332. In some embodiments, the first input device 332 may provide an indication when a user begins interaction with the first input device 332 and stops interaction with the first input device 332. For example, when a user pushes a button and releases a button.

In some embodiments, the second input device 334 may be a button or some other type of input device. The second input device 334 may provide a signal to the processor 310 in response to interaction of a user with the second input device 334. In these and other embodiments, the second input device 334 may provide an indication when a user begins interaction with the second input device 334 and stops interaction with the second input device 334.

The light emitting system 340 may include a light emitting device 342. The light emitting device 342 may include one or more light emitting diodes or other light emitting elements. For example, the light emitting device 342 may include a single semiconductor device that includes the one or more light emitting diodes or other light emitting elements. The light emitting system 340 may include one or more elements and/or circuits, such as driver circuits, configured to cause the light emitting device 342 to emit light, stop emitting light, and to change a wavelength, intensity, duration, and/or temperature of light being emitted.

In some embodiments, the light emitting system 340 may cause the light emitting device 342 to emit light, stop emitting light, and to change wavelengths, intensities, durations, and/or temperatures of light being emitted based on directions from the processor 310. For example, in response to instructions from the processor 310, the light emitting system 340 may cause the light emitting device 342 to emit light or stop emitting light. Alternately or additionally, in response to instructions from the processor 310, the light emitting system 340 may cause the light emitting device 342 to emit light associated with a particular function or mode of a particular function, such as a curing function or diagnosis function. In some embodiments, the processor 310 may be configured to direct the light emitting system 340 to emit light according to a current mode of a current function. The current mode of a current function may be a most recently selected mode and function based on input from a user.

In some embodiments, the sensor system 350 may be configured to provide input to the processor 310 from one or more of a first sensor 352 and a second sensor 354. In some embodiments, the first sensor 352 may be an accelerometer or other type of sensor configured to detect movement. The first sensor 352 may provide signals indicating movement of the first sensor 352 to the processor 310.

In some embodiments, the second sensor 354 may be configured to detect a temperature of the light emitting system 340. For example, the second sensor 354 may be configured to provide a signal to the processor 310 indicating a temperature of the light emitting system 340.

In some embodiments, the processor 310 may obtain signals from the sensor system 350. For example, the processor 310 may obtain signals from the second sensor 354. In response to a signal from the second sensor 354 indicating a temperature of the light emitting system 340 is above a threshold, the processor 310 may direct the light emitting system 340 to stop emitting light. Alternately or additionally, the processor 310 may not direct the light emitting system 340 to direct light in response to user input to emit light in response to the temperature being above a threshold.

As another example, the processor 310 may obtain signals from the first sensor 352. The processor 310 may be configured to analyze the signals from the first sensor 352 regarding movement detected by the first sensor 352. In these and other embodiments, the processor 310 may analyze the signals from the first sensor 352 to determine characteristics of the signals. Based on the characteristics of the signals, the processor 310 may determine if the characteristics of the signals match characteristics of one or more particular movements. In response to the characteristics of the signals matching characteristics of one or more particular movements, the processor 310 may determine that the movement detected corresponds to a user input. In response to the movement corresponding to a user input, the processor 310 may perform operations associated with the user input. For example, the processor 310 may change a current mode for emission of light or may direct the light emitting system 340 to stop emitting light in response to user input.

For example, in some embodiments, a first movement may correspond to a first function and a second movement may correspond to a second function. In response to the first movement being detected and the light emitting device 342 emitting light, the processor 310 may direct the light emitting system 340 to stop emission of light. Similarly, in response to the second movement being detected and the light emitting device 342 emitting light, the processor 310 may direct the light emitting system 340 to stop emission of light.

In some embodiments, in response to the first movement being detected, the light emitting device 342 not emitting light, and a mode current being a mode of the second function, the processor 310 may select a first mode of the first function as a current mode. Based on the first mode of the first function being a current mode, when user input is obtained to emit light, the processor 310 may direct the light emitting device 342 to emit light corresponding to the first mode of the first function. As such, in response to the first movement and a current mode being a mode of the second function, detection of the first movement may result in a change from the second function to a mode of the first function.

In some embodiments, in response to the first movement being detected, the light emitting device 342 not emitting light, and a first mode of the first function being a current mode, the processor 310 may select a second mode of the first function as a current mode. As such, in response to the first movement and a current mode being a mode of the first function, detection of the first movement may result in a change between the modes of the first function.

In some embodiments, in response to the second movement being detected, the light emitting device 342 not emitting light, and a mode of the first function being a current mode, the processor 310 may select a first mode of the second function as a current mode. Based on the first mode of the second function being a current mode, when user input is obtained to emit light, the processor 310 may direct the light emitting device 342 to emit light corresponding to the first mode of the second function. As such, in response to the second movement and a current mode being a mode of the first function, detection of the second movement may result in a change from the first function to a mode of the second function.

In some embodiments, in response to the second movement being detected, the light emitting device 342 not emitting light, and a first mode of the second function being a current mode, the processor 310 may select a second mode of the second function as a current mode. As such, in response to the second movement and a current mode being a mode of the second function, detection of the second movement may result in a change between the modes of the second function.

In some embodiments, the processor 310 may obtain signals from the first input device 332 and the second input device 334. The processor 310 may be configured to determine a length of time that a user interacts with each of the first input device 332 and the second input device 334. In these and other embodiments, the processor 310 may compare the length of time to one or more thresholds. Based on the comparisons, the processor 310 may change a current mode for emission of light or the processor 310 may direct the light emitting system 340 to stop emitting light or to emit light. In these and other embodiments, in a manner similar to the operations performed by the processor 310 in response to the first movement and the second movement, the processor 310 may select a current mode based on a previous current mode. Alternately or additionally, based on the comparisons, the processor 310 may enter or exit one or more states, such as a sleep state.

Modifications, additions, or omissions may be made to the dental care device 300 without departing from the scope of the present disclosure. For example, in some embodiments, the dental care device 300 may include a communication unit that may include any component, device, system, or combination thereof that is configured to transmit or receive information over a network. For example, the communication unit may include a network card (wireless or wired), an infrared communication device, a wireless communication device (such as an antenna), and/or chipset (such as a Bluetooth® device, an 802.6 device (e.g., Metropolitan Area Network (MAN)), a WiFi device, a WiMax device, cellular communication facilities, etc.), and/or the like.

As another example, the user input system 330 may include fewer or additional input devices than the first input device 332 and the second input device 334. Alternately or additionally, the dental care device 300 may include additional sensors. Alternately or additionally, the dental care device 300 may include one or more visual indicators. The visual indicators may be a light or some other visual indicator. The visual indicators may indicate a current mode of the dental care device 300.

Figure 4:
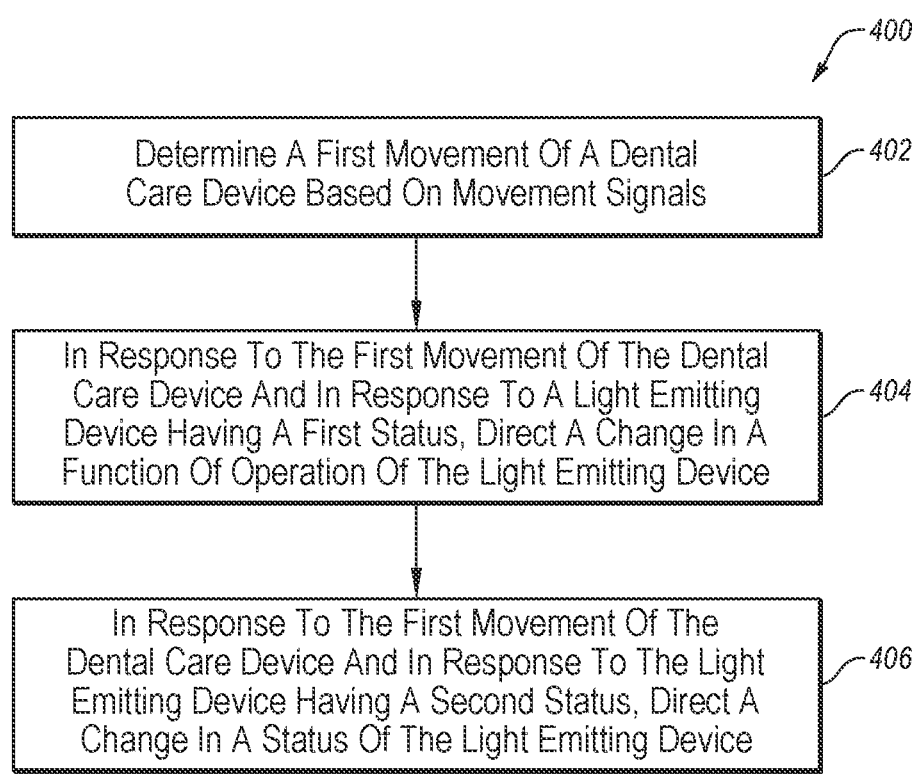
FIG. 4 illustrates a flowchart of example operations of a dental care device.
Figure 5A:
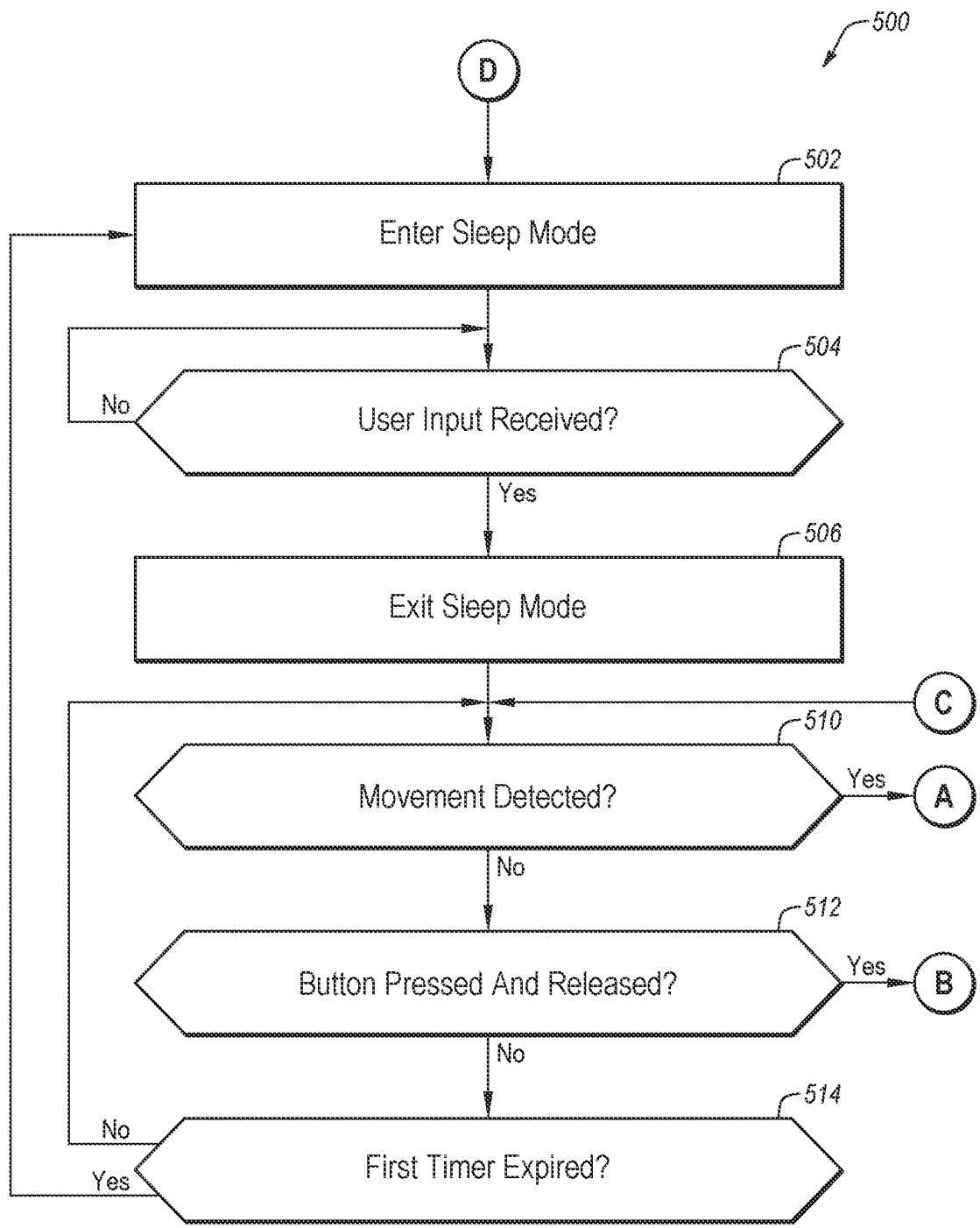
FIGS. 5A-5E illustrates a flowchart of an example method of operation of a dental care device.
Figure 5B:
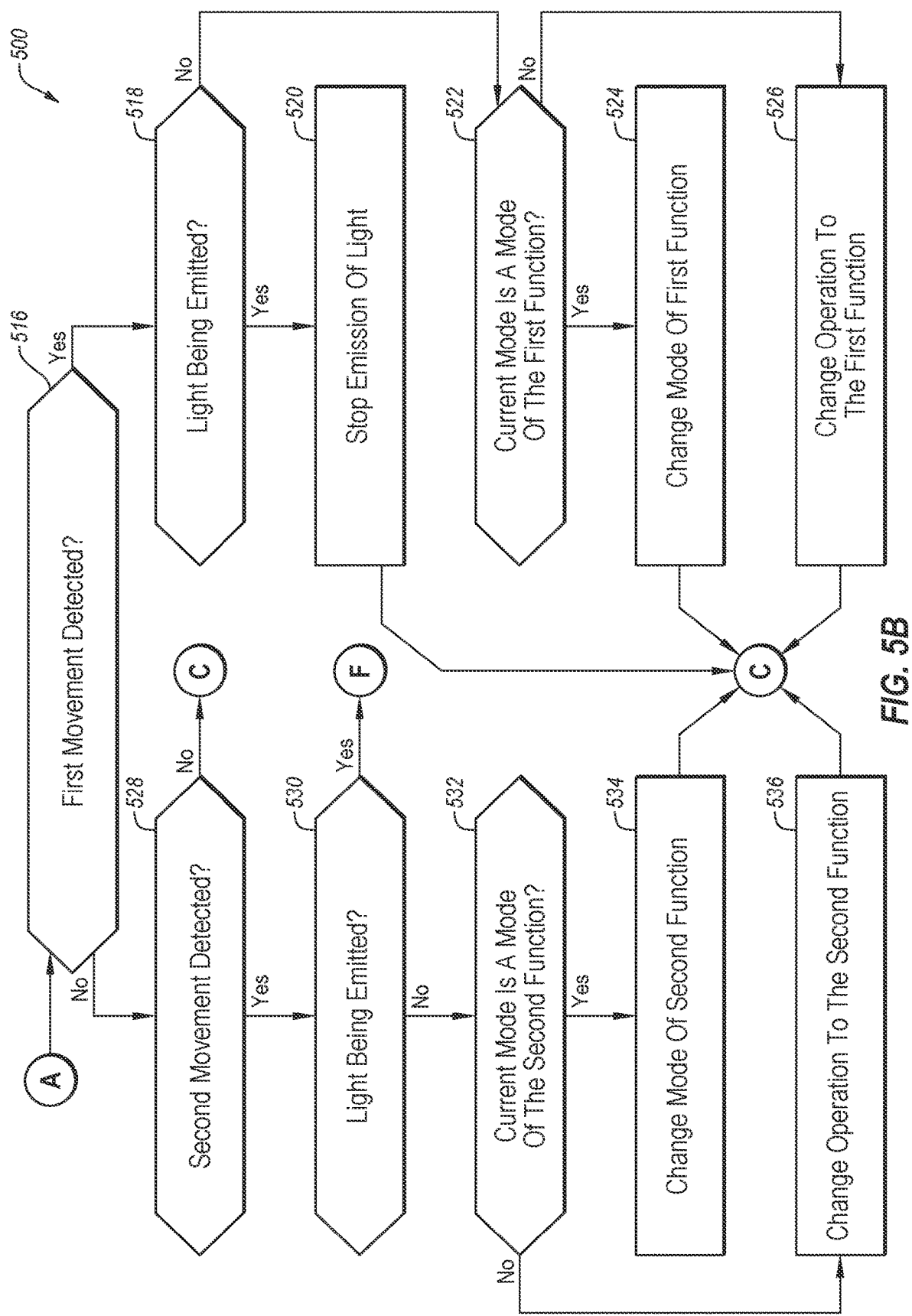
Figure 5C:
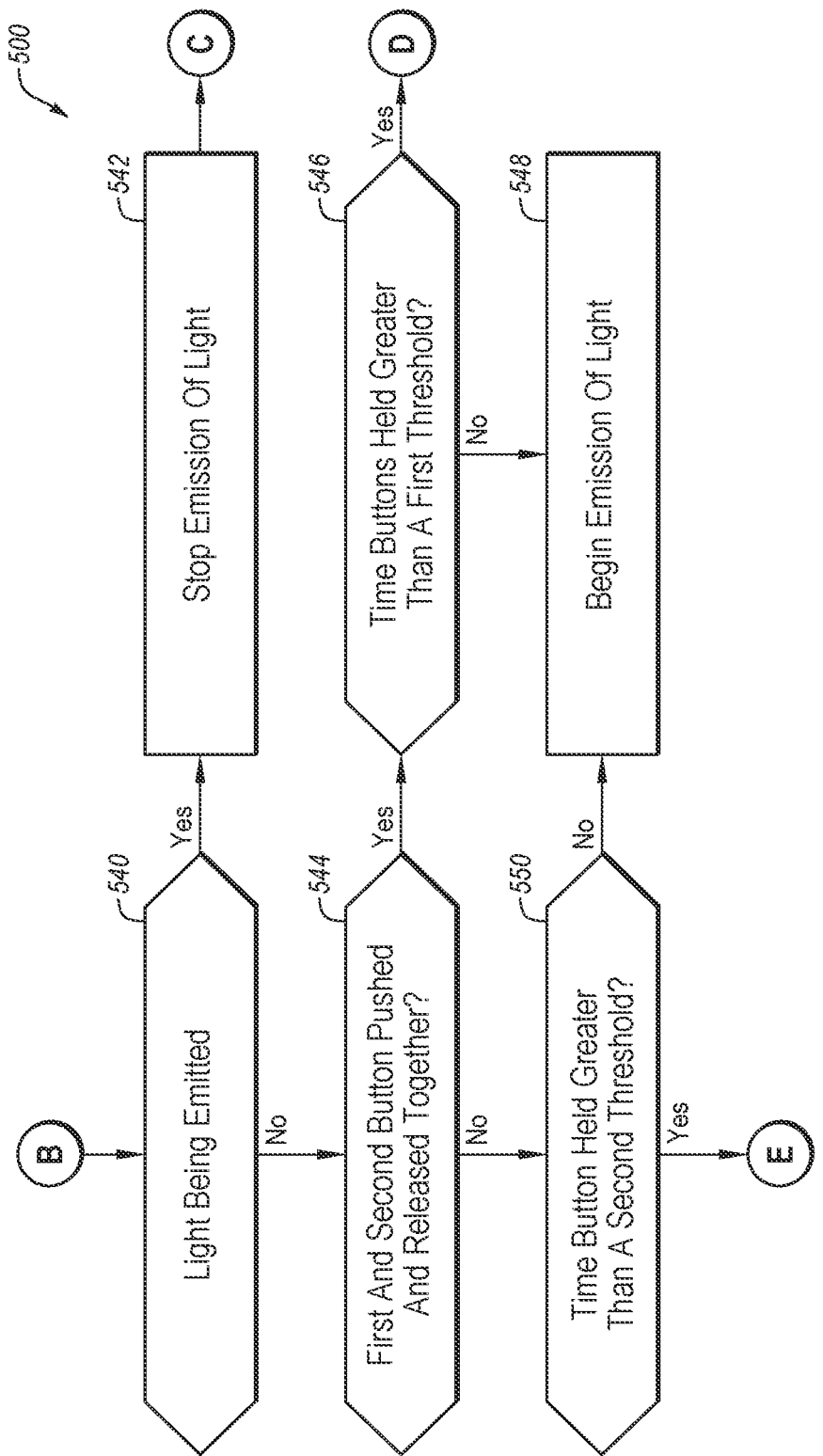
Figure 5D:
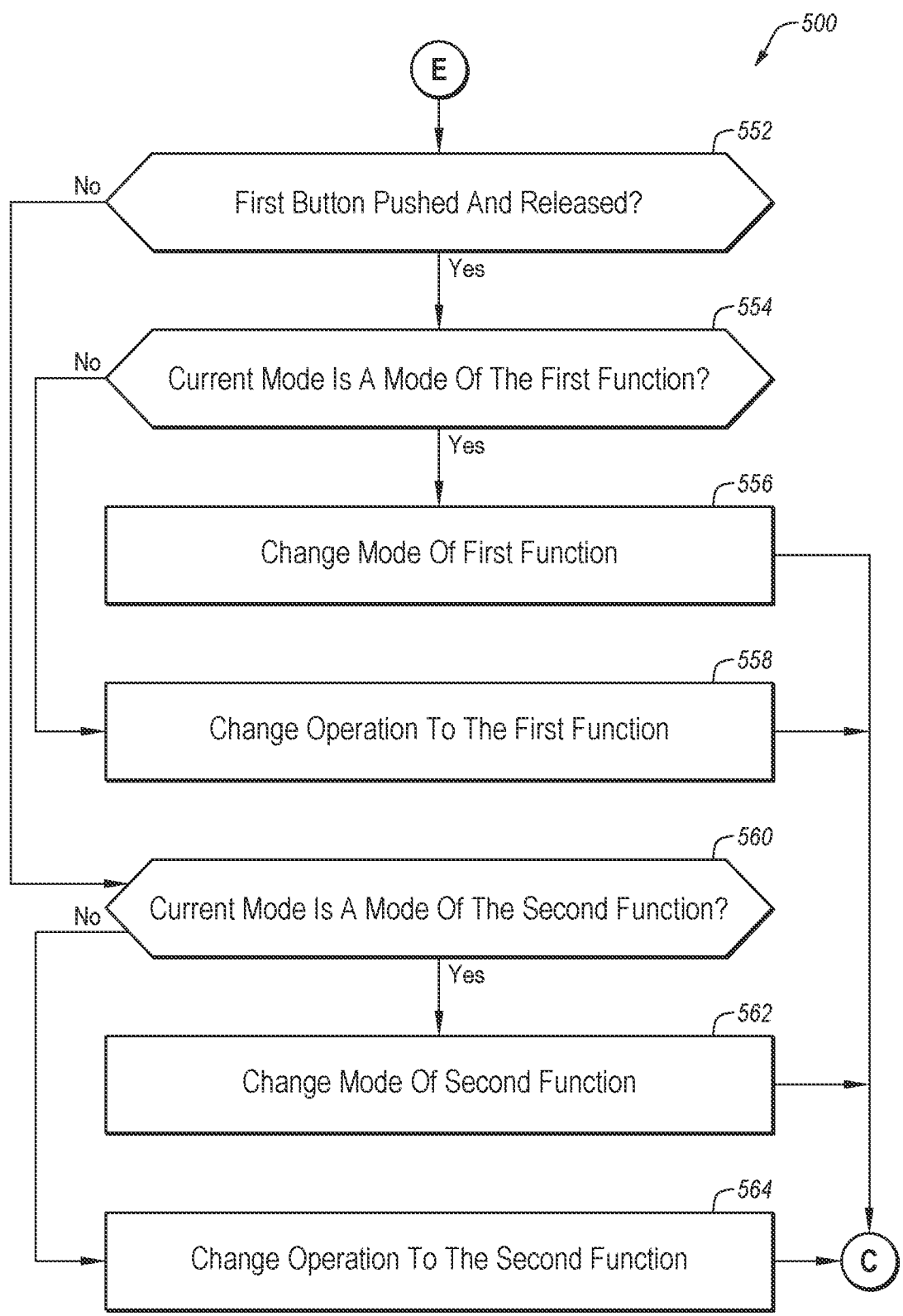
Figure 5E:
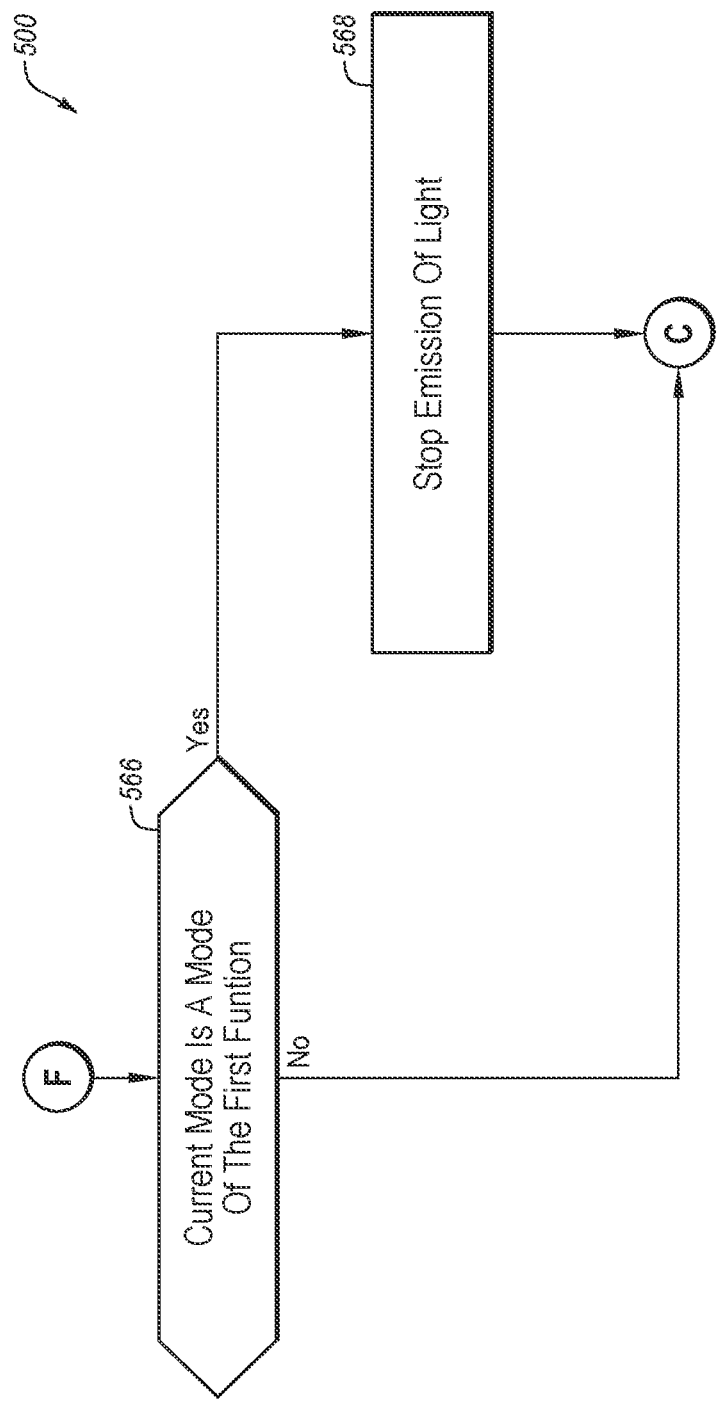

FIG. 4 illustrates a flowchart of example operations 400 of a dental care device. The operations 400 may be arranged in accordance with at least one embodiment described in the present disclosure. The operations 400 may be performed, in some embodiments, by a device, such as the dental care device 100 or 300 of FIGS. 1 and 3 or another device, combination of devices, or system. In these and other embodiments, the operations 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The operations 400 may begin at block 402, where a first movement of the dental care device may be determined based on the movement signals. In some embodiments, the first movement may be in a direction substantially perpendicular to a direction of a gravitational force of the earth. Alternately or additionally, the first movement may be in a direction substantially parallel to a direction of a gravitational force of the earth.

At block 404, in response to the first movement of the dental care device and in response to a light emitting device having a first status, a change in a function of operation of the light emitting device may be directed.

At block 406, in response to the first movement of the dental care device and in response to the light emitting device having a second status, a change in a status of the light emitting device may be directed. In some embodiments, directing the change in the status of the light emitting device may include directing the light emitting device to change to the first status.

In some embodiments, the status of the light emitting device may determine light emission by the light emitting device. In these and other embodiments, the light emitting device may have the first status when the light emitting device does not emit light and the light emitting device may have the second status when the light emitting device emits light.

It is understood that, for this and other processes and operations disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the operations 400 may further include determine a second movement of the dental care device based on the movement signals and in response to the second movement of the dental care device and the light emitting device having the first status, select a second function of the operation of the plurality of functions of operation. The operations 400 may further include in response to the second movement of the dental care device and the light emitting device having the second status, direct the light emitting device to stop emitting light. In these and other embodiments, the second movement may be in a direction substantially parallel to a direction of a gravitational force of the earth.

As another example, the operations 400 may further include when a first function is selected, direct the light emitting device to stop emitting light at a first exposure time and when a second function is selected, direct the light emitting device to stop emitting light at a second exposure time. In these and other embodiments, the second exposure time may be larger than the first exposure time.

FIGS. 5A-5E illustrates a flowchart of an example method 500 of operation of a dental care device. The method 500 may be arranged in accordance with at least one embodiment described in the present disclosure. One or more operations of the method 500 may be performed, in some embodiments, by a device, such as the dental care device 100 or 300 of FIGS. 1 and 3 or another device, combination of devices, or system. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, where a dental care device may enter a sleep mode. A sleep mode may be a low power mode of the dental care device. In the sleep mode, the dental care device may not emit light and other functions of the dental care device may be terminated and/or reduced.

At block 504, it may be determined if the user input is received. In response to user input being received, the method 500 may proceed to block 506. In response to user input not being received, the method 500 may continue in block 504. User input may include movement of the dental care device by a user or user interaction with a button of the dental care device. For example, a user depressing and releasing the button may be user input. Alternately or additionally, any movement detected by a sensor of the dental care device may be movement of the dental care device as determined in block 504.

At block 506, the dental care device may exit the sleep mode in response to the movement detected in block 504.

At block 510, it may be determined if movement of the dental care device is detected. In response to movement of the dental care device being detected, the method 500 may proceed to block 516. In response to movement of the dental care device not being detected, the method 500 may proceed to block 512. The movement detected by the dental care device may be movements that correspond to particular movements associated with user inputs. For example, the movements detected by the dental care device in block 510 may correspond to one or movements as illustrated in FIG. 2.

At block 512, it may be determined if a button is pressed and released. In response to a button being pressed and released, the method 500 may proceed to block 540. In response to a button not being pressed and released, the method 500 may proceed to block 514.

At block 514, it may be determined if a first timer is expired. In response to the first timer being expired, the method 500 may proceed to block 502. In response to the first timer not being expired, the method 500 may proceed to block 510. The first timer may begin in response to the dental care device exiting the sleep mode in block 506.

At block 516, it may be determined if movement of the dental care device is a first movement. In response to movement of the dental care device being the first movement, the method 500 may proceed to block 518. In response to movement of the dental care device not being the first movement, the method 500 may proceed to block 528. For example, it may be determined if the movement of the dental care device is a first movement that follows a first path, such as the first path 220 of FIG. 2.

At block 518, it may be determined if the dental care device is emitting light. In response to the dental care device emitting light, the method 500 may proceed to block 520. In response to the dental care device not emitting light, the method 500 may proceed to block 522. At block 520, the dental care device may stop emission of light.

At block 522, it may be determined if the current mode of operation is a mode of the first function of operation. In response to current mode of operation being a mode of the first function of operation, the method 500 may proceed to block 524. In response to current mode of operation not being a mode of the first function of operation, the method 500 may proceed to block 526. For example, the current mode of operation may be a mode of the second function of operation.

At block 524, the current mode of operation of the dental care device may be changed to another mode of the first function of operation. For example, if the current mode of operation is a first mode of the first function, the current mode of operation may be changed to a second mode of the first function.

At block 526, the current mode of operation of the dental care device may be changed to a first mode of the first function of operation from a second function of operation.

At block 528, it may be determined if movement of the dental care device is a second movement. In response to movement of the dental care device being the second movement, the method 500 may proceed to block 530. For example, it may be determined if the movement of the dental care device is a second movement that follows a second path, such as the second path 230 of FIG. 2. In response to movement of the dental care device not being the second movement, the method 500 may proceed to block 510. For example, if the movement is not the first movement or the second movement, the movement of the device may not be associated with a particular movement that corresponds to a user input for changing a function or mode of operation and/or stopping emission of light.

At block 530, it may be determined if the dental care device is emitting light. In response to the dental care device emitting light, the method 500 may proceed to block 566. In response to the dental care device not emitting light, the method 500 may proceed to block 532.

At block 566, it may be determined if the current mode of operation is a mode of the first function of operation. In response to the current mode of operation being a mode of the first function of operation, the method 500 may proceed to block 568. At block 568, the dental care device may stop emission of light. In response to the current mode of operation not being a mode of the first function of operation, the method 500 may proceed to block 510. For example, the current mode of operation may be a mode of the second function of operation. Thus, if a movement is detected when the current mode of operation is a mode of the second function of operation and light is being emitted, the movement may not change a state of the dental care device. Thus, the dental care device may not change states in response to a movement that would otherwise change the state of the dental care device when the dental care device is not emitting light.

At block 532, it may be determined if the current mode of operation is a mode of the second function of operation. In response to current mode of operation being a mode of the second function of operation, the method 500 may proceed to block 534. In response to current mode of operation not being a mode of the second function of operation, the method 500 may proceed to block 536. For example, the current mode of operation may be a mode of the first function of operation.

At block 534, the current mode of operation of the dental care device may be changed to another mode of the second function of operation. For example, if the current mode of operation is a first mode of the second function, the current mode of operation may be changed to a second mode of the second function.

At block 536, the current mode of operation of the dental care device may be changed to a first mode of the second function of operation from a first function of operation.

At block 540, it may be determined if the dental care device is emitting light. In response to the dental care device emitting light, the method 500 may proceed to block 542. At block 542, the dental care device may stop emission of light. In response to the dental care device not emitting light, the method 500 may proceed to block 544.

At block 544, it may be determined if a first and second button are pushed and released together. In response to the first and second button being pushed and released together, the method 500 may proceed to block 546. In response to the first and second button not being pushed and released together, the method 500 may continue in block 550.

At block 546, it may be determined if a time that the first and second buttons are suppressed is greater than a first threshold. In response to the time being greater than the first threshold, the method 500 may proceed to block 502 to enter the sleep mode. In response to the time not being greater than the first threshold, the method 500 may proceed to block 548.

At block 548, the dental care device may begin emission of light according to the current mode of operation.

At block 550, it may be determined if a time that a button is suppressed is greater than a second threshold. In response to the time being greater than the second threshold, the method 500 may proceed to block 522. In response to the time not being greater than the second threshold, the method 500 may proceed to block 548. The second threshold may be shorter than the first threshold discussed with respect to block 546. The determination in 550 may determine if either one of the first or second button was pressed for time less than the second threshold. Pressing either one of the of the first or second buttons for time less than the second threshold may cause the dental care device to begin emission of light in block 548.

At block 552, it may be determined if the first button is pushed and released. In response to the first button being pushed and released, the method 500 may proceed to block 554. In response to the first button not being pushed and released, the method 500 may proceed to block 560. The determination that the first button is not pushed and released indicates that the second button is pushed and released because it was previously determined that one of the first button and the second buttons was pushed and released and if the first button is not pushed and released then the second button is pushed and released.

At block 554, it may be determined if the current mode of operation is a mode of the first function of operation. In response to current mode of operation being a mode of the first function of operation, the method 500 may proceed to block 556. In response to current mode of operation not being a mode of the first function of operation, that is the current mode being a mode of the second function, the method 500 may proceed to block 558.

At block 556, the current mode of operation of the dental care device may be changed to another mode of the first function of operation. At block 558, the current mode of operation of the dental care device may be changed to a first mode of the first function of operation from a second function of operation.

At block 560, it may be determined if the current mode of operation is a mode of the second function of operation. In response to current mode of operation being a mode of the second function of operation, the method 500 may proceed to block 562. In response to current mode of operation not being a mode of the second function of operation, that is the current mode being a mode of the first function, the method 500 may proceed to block 564.

At block 562, the current mode of operation of the dental care device may be changed to another mode of the second function of operation. At block 564, the current mode of operation of the dental care device may be changed to a first mode of the second function of operation from a mode of the first function of operation.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
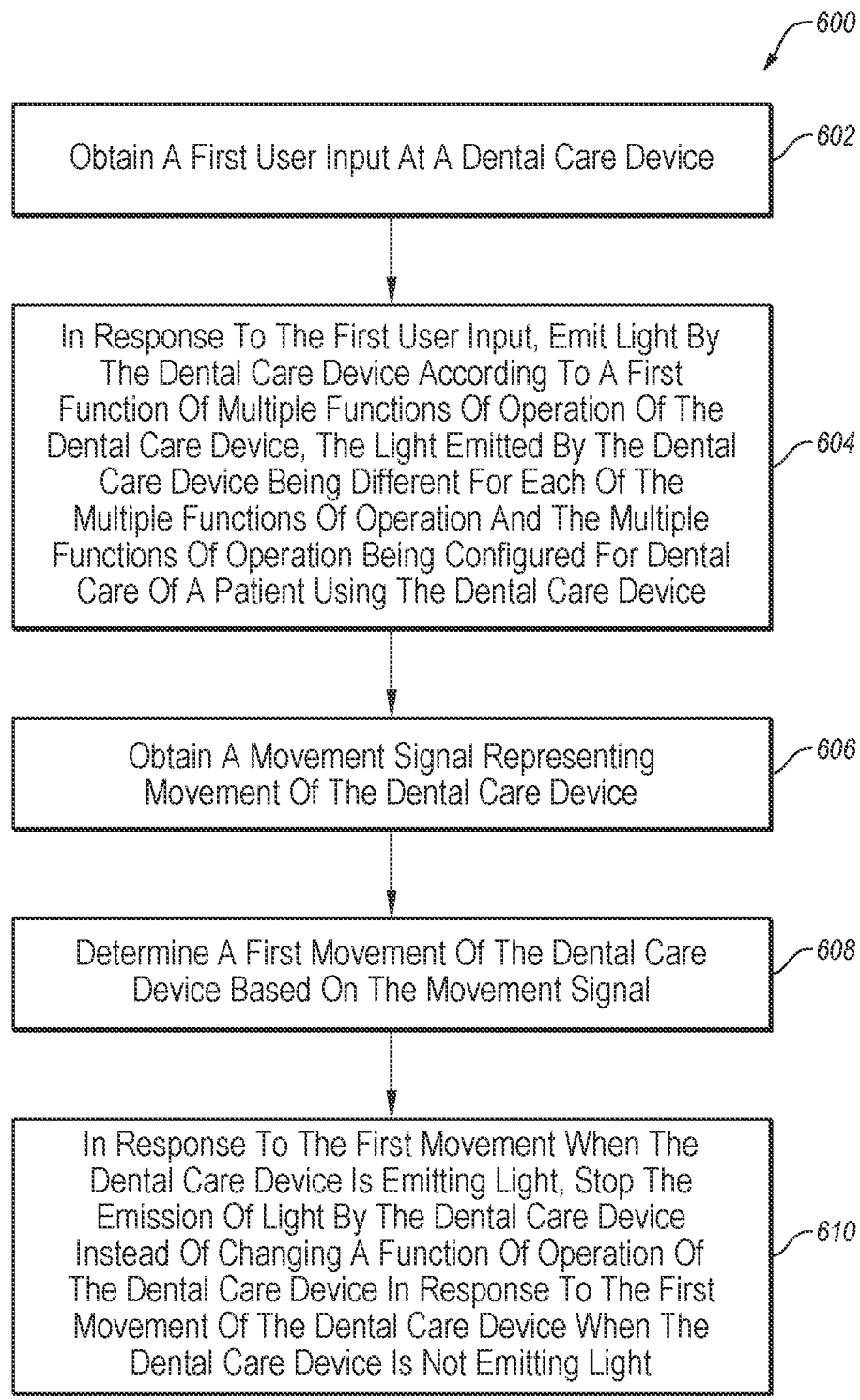
FIG. 6 illustrates a flowchart of another example method of operation of a dental care device.

FIG. 6 illustrates a flowchart of an example method 600 of operation of a dental care device. The method 600 may be arranged in accordance with at least one embodiment described in the present disclosure. One or more operations of the method 600 may be performed, in some embodiments, by a device, such as the dental care device 100 or 300 of FIGS. 1 and 3 or another device, combination of devices, or system. In these and other embodiments, the method 600 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 600 may begin at block 602, where a first user input may be obtained at a dental care device.

At block 604, in response to the first user input, light may be emitted by the dental care device according to a first function of multiple functions of operation of the dental care device. The light emitted by the dental care device may be different for each of the multiple functions of operation and the multiple functions of operation may be configured for dental care of a patient using the dental care device.

At block 606, a movement signal representing movement of the dental care device may be obtained. At block 608, a first movement of the dental care device may be determined based on the movement signal. In some embodiments, the first movement may be in a direction substantially perpendicular to a direction of a gravitational force of the earth.

At block 610, in response to the first movement when the dental care device is emitting light, the emission of light may be stopped by the dental care device instead of changing a function of operation of the dental care device in response to the first movement of the dental care device when the dental care device is not emitting light. In these and other embodiments, when the first function is selected the emission of light may be stopped at a first exposure time.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 600 may further include obtaining a second movement signal representing second movement of the dental care device and determine a second movement of the dental care device based on the second movement signal. The method 600 may further include in response to the second movement of the dental care device when the dental care device is not emitting light, selecting a second function of operation of the multiple functions of operation instead of stopping the emission of light by the dental care device when the dental care device is emitting light.

In some embodiments, the second movement may be in a direction substantially parallel to a direction of a gravitational force of the earth.

As another example, the method 600 may further include after the first exposure time, obtaining a second movement signal representing second movement of the dental care device and determine a second movement of the dental care device based on the second movement signal. The method 600 may also include obtaining a second user input at the dental care device and in response to the second movement of the dental care device and the second user input, emitting light by the dental care device according to a second function of operation.

Figure 7:
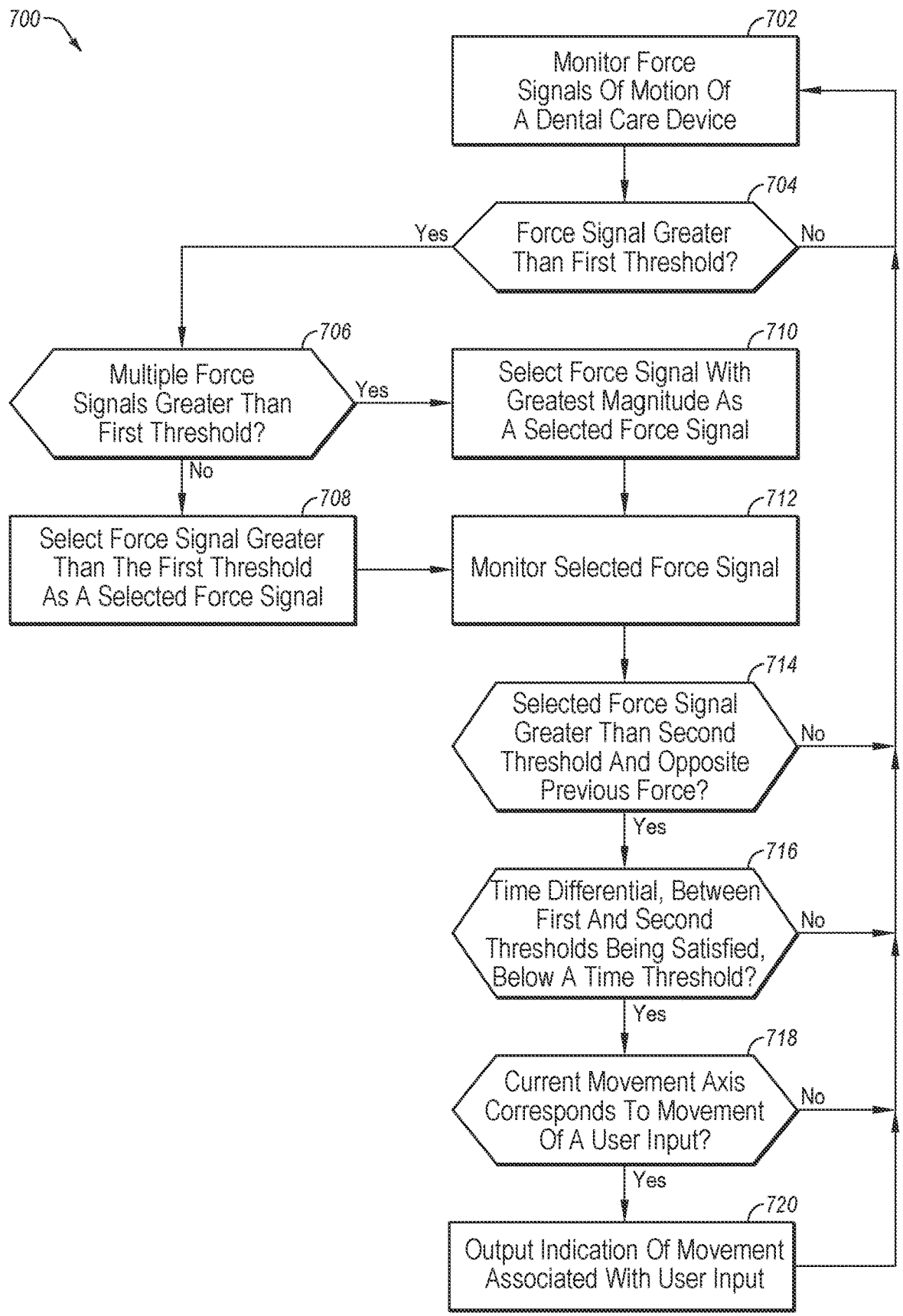
FIG. 7 illustrates a flowchart of another example method of operation of a dental care device.

FIG. 7 illustrates a flowchart of an example method 700 of operation of a dental care device. The method 700 may be arranged in accordance with at least one embodiment described in the present disclosure. One or more operations of the method 700 may be performed, in some embodiments, by a device, such as the dental care device 100 or 300 of FIGS. 1 and 3 or another device, combination of devices, or system. In these and other embodiments, the method 700 may be performed based on the execution of instructions stored on one or more non-transitory computer-readable media. Although illustrated as discrete blocks, various blocks may be divided into additional blocks, combined into fewer blocks, or eliminated, depending on the desired implementation.

In general, the method 700 may be used to detect a movement of a dental care device. Movement of the dental care device may be used to control the dental care device. For example, the movement detected by the method 700 may be used in the method 500 of FIGS. 5A-5E. As an example, the method 700 may be performed in block 510 of method 500 and used to detect movements that correspond to particular movements associated with user inputs to the dental care device. The particular type of movement output by the method 700 may be used in block 516 and block 528 of method 500 that consider the type of movement detected.

In these and other embodiments, an example of user movement may include the tapping or waving illustrated in FIGS. 2B and 2C, respectively. The method 700 may determine if the user movement include the criteria sufficient to allow the user movement to register as a user input. For example, the user input may be a single down tap as illustrated in FIG. 2B. In some embodiments, the single down tap may include criteria sufficient to allow the user movement to register as a user input based on a minimum acceleration and a minimum deceleration within a particular time frame. The method 700 may be used to determine if the minimum acceleration and the minimum deceleration occur within the particular time frame in the tapping motion to allow the user movement to register as a user input.

The method 700 may begin at block 702, where force signals may be monitored. The force signals may be monitored by a processor of a dental care device, such as the processor 310 of FIG. 3. The force signals may be obtained by the processor from a sensor within the dental care device, such as the first sensor 352 or the second sensor 354. The force signals may indicate a force applied to the dental care device. The force may be applied to the dental care device based on movement of the dental care device. For example, acceleration of the dental care device may result in a force being applied to the dental care device based on the mass of the dental care device.

In some embodiments, the force signals may include multiple force signals. Each of the multiple force signals may correspond to a different sensing axis of the sensor generating the force signals. For example, the sensor may have three sensing axes. In these and other embodiments, the sensing axes may correspond to three perpendicular planes, such as x, y, and z planes of a cartesian coordinate system. In these and other embodiments, the force signals may be obtained for each of the three axes simultaneously. Thus, the force signals may include an x-axis force signal, a y-axis force signal, and a z-axis force signal. For example, the force signals illustrated in FIG. 2D may be an example of the force signals obtained. In these and other embodiments, the force signals may be data that is continuously output by the sensor and monitored by the processor with respect to thresholds of the force signals.

At block 704, it may be determined if one or more of the force signals has a magnitude greater than a first magnitude threshold. In response to one of the force signals having a magnitude greater than the first magnitude threshold, the method 700 may proceed to block 706. In response to none of the force signals having a magnitude greater than the first magnitude threshold, the method 700 may proceed to block 702 and the force signals may continue to be monitored. As an example, the block 704 may be used to determine if the movement of the dental care device as indicated by the force signals meets the minimum acceleration of a single down tap that registers as a user input.

In these and other embodiments, at block 704 it may also be determined if the force signal with a magnitude greater than the first magnitude threshold has a positive force indicating an acceleration and not a deceleration of the dental care device. In these and other embodiments, if the force signal indicates a deceleration of the dental care device, the method may proceed to block 702 and the force signals may continue to be monitored.

At block 706, it may be determined if more than one of the force signals has a magnitude greater than the first magnitude threshold. In response to more than one of the force signals having a magnitude greater than the first magnitude threshold, the method 700 may proceed to block 710. In response to only one of the force signals having a magnitude greater than the first magnitude threshold, the method 700 may proceed to block 708.

At block 708, the force signal with a magnitude greater than the first magnitude threshold may be designated as a selected force signal and a sensing axis for the selected force signal may be noted as a current movement axis. The current movement axis may indicate a sensing axis in which a movement of the dental care device may be detected. For example, when the current movement axis is the y-axis, movement in the y-plane, such as a movement along the first path 220 illustrated in FIGS. 2A and 2B, i.e. movement of a tap, may be detected by the method 700.

At block 710, the force signal with the greatest magnitude of the force signals may be designated as the selected force signal and the sensing axis for the selected force signal may be noted as the current movement axis. Thus, if more than one force signal has a magnitude greater than the first magnitude threshold, the largest force signal may be the selected force signal and the sensing axis of the selected force signal may be noted as the current movement axis. For example, a user may move the dental care device in a sidewise motion that causes both the x-axis force signal and the y-axis force signal to be greater than the threshold. In these and other embodiments, the x-axis force signal may correspond to a waving motion and the y-axis force signal may correspond to a tapping motion. Because the two force signals correspond to different motion, only one of the force signals may be selected to determine if the motion associated with the force signal occurs. In these and other embodiments, the force signal that is the largest may be selected.

At block 712, the selected force signal may continue to be monitored. The other force signals may not continue to be monitored with respect to blocks 714, 716, 718, and 720 of the method 700. In these and other embodiments, only the selected force signal may be monitored to determine if the current movement in the sensing axis of the selected force signal includes characteristics that correspond to particular movements associated with user inputs to the dental care device. In short, once a user has begun a movement in the sensing axis of the selected force signal that includes one or more characteristics but not all of the characteristics of particular movements associated with user inputs, the method 700 ignores other movements of the dental care device to determine if the user finishes producing movements with all of the characteristics of a particular movement associated with user inputs.

As an example, a movement associated with user input may be a tapping motion as illustrated in FIG. 2B in a y-axis plane. The first magnitude threshold being satisfied by a force signal may indicate that a user has begun moving the dental care device with enough acceleration to meet the first magnitude threshold. The higher the first magnitude threshold, the more a user must accelerate the dental care device in the y-axis plane to cause the motion to include characteristics that correspond to the tapping motion associated with a user input. After the user has begun the tapping motion in the y-axis plane, other motions outside of the y-axis plane may not result in the full tapping motion including characteristics that correspond to the tapping motion associated with a user input. As a result, the method 700 does not consider the other motions outside of the y-axis plane until it may be determined that the tapping motion begun does or does not include all of the characteristics that correspond to the tapping motion associated with a user input.

At block 714, it may be determined if the selected force signal has a magnitude greater than a second magnitude threshold and is opposite to the force used in block 704. The determination made in block 714 may occur at a time after the determination made in block 704. In response to the selected force signal having a magnitude greater than the second magnitude threshold and being opposite to the force, the method 700 may proceed to block 716. In response to the selected force signal either not having a magnitude greater than the second magnitude threshold and/or not being opposite to the force, the method 700 may proceed to block 702 and the force signals may continue to be monitored.

In these and other embodiments, the selected force signal being opposite the force signal as monitored in block 702 may indicate that the force is a result of a movement opposite to the movement occurring in block 702. For example, for an acceleration in block 702, a deceleration in block 712 may result in an opposite force. As another example, FIG. 2D illustrates a first force signal 280 that has a first force at a first time and a second force at a second time after the first time that is opposite to the first force. For example, the first peak 282 of the first force signal 280 may be used to meet the first magnitude threshold in block 704 and the second peak 284 of the first force signal 280 may be used to meeting the second magnitude threshold in block 714.

As an example, with respect to FIG. 2B, a user may accelerate the dental care device 250 starting at the top position to move the dental care device 250 toward the bottom position. The force caused by the acceleration of moving from the top position may be compared to the first magnitude threshold in block 704. As the dental care device 250 approaches the bottom position, the user may decelerate the dental care device 250 to stop the dental care device 250 at the bottom position. The force caused by the deceleration to stop at the bottom position may be compared to the second magnitude threshold at block 714. Note that the force caused by the deceleration is opposite the force caused by the acceleration. Thus a movement of the dental care device 250 in a single direction may be recognized as a user input by the dental care device 250. Thus, the dental care device 250 may not require movement in a first direction and second direction, such as a back-and-forth movement, to be recognized as a user input by the dental care device 250.

In some embodiments, the second magnitude threshold may be the same as the first magnitude threshold. For example, a tapping motion associated with a user input may include characteristics of a user accelerating at, at least a first rate and then a user decelerating at, at least the first rate. Alternately or additionally, the second magnitude threshold may be different than the first magnitude threshold. For example, the second magnitude threshold may be greater or less than the first magnitude threshold indicating that the user may decelerate faster or slower to have movement associated with a user input.

At block 716, it may be determined if a time differential, between the first and second magnitude thresholds being satisfied, is below a time threshold. In response to the time differential being below the time threshold, the method 700 may proceed to block 718. In response to the time differential not being below the time threshold, the method 700 may proceed to block 702 and the force signals may continue to be monitored.

The time threshold may determine a length of time for the movement between an acceleration phase of the movement and the deceleration phase of a movement as evidenced by the first and second magnitude thresholds being satisfied. For example, a larger time threshold may allow for a smaller or larger movement, such as a tap with an arc length between three inches and 36 inches, to be determined to be a user input. In contrast, a smaller time threshold may allow for a smaller movement, such as a tap with an arc length between three inches and 6 inches, to be determined to be a user input. In these and other embodiments, the time threshold may be based on the first and second magnitude thresholds.

At block 718, it may be determined if the current movement axis corresponds to a movement axis of movements associated with a user input for the dental care device. In response to the current movement axis corresponding to a movement axis of movements associated with a user input, the method 700 may proceed to block 720. In response to the current movement axis not corresponding to a movement axis of movements associated with a user input, the method 700 may proceed to block 702 and the force signals may continue to be monitored.

For example, a current movement axis may be the x-axis. A movement, such as a wave illustrated in FIG. 2C, may be a movement in the x-axis. Because the current movement axis corresponds to the movement axis of user input, it may be determined that the movement detected by the method 700 correspond to a user input. As another example, the current movement axis may be the z-axis. No movement that corresponds to a user input may occur in the z-axis. As a result, it may be determined that the movement detected by the method 700 does not correspond to a user input.

At block 720, an indication of movement associated with user input may be output. For example, the method 700 may determine that the dental care device has moved in a tap motion such as illustrated in FIG. 2B. An indication of the user input may be provided and used in steps 516 and 528 of FIG. 5 to control the device, such as to cause a change in light emitted by a light emitting device of the dental care device. After a movement associated with user input is determined, the method 700 may return to block 702 and continue to monitor for additional user input.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. For example, in some embodiments, the block 718 may be between the blocks 708 and 712 and block 710 and 712. In these and other embodiments, if the current movement axis does not correspond to a movement that corresponds to user input, the method 700 may proceed to block 702 and blocks 712, 714, and 716 may not occur.

Note that the method 700 may assist in reducing unwanted or unintentional motions from resulting in a change in light emitted by a light emitting device of the dental care device. Reducing unwanted motions from resulting in a change in light emitted by a light emitting device may be a safety feature of the dental care device. For example, without the criteria of FIG. 7, if the dental care device is dropped, the falling motion may cause the light emitting device to emit light, which may be directed at the eyes of a user. Using the criteria of FIG. 7, however, the first and second magnitude thresholds and the time threshold may be set such that the dental care device being dropped would not result in the light emitting device to emit light. For example, the first magnitude threshold may be set to be higher than the force resulting from gravity and the time threshold may be set short enough such that a drop over six inches would cause the acceleration and deceleration phases to have a time differential therebetween larger than the time threshold. Additionally, meeting the criteria may enable a change in mode (e.g., type or pattern of light emitted) or may result in stopping light from being emitted while another, separate action, such as pressing a button, may be required to cause the dental care device to emit light as another safety feature.

Alternately or additionally, the criteria of FIG. 7, may further reduce unwanted motions from resulting in a change in light emitted by the dental care device. For example, the first and second magnitude thresholds and the time threshold may be set such that movement of the dental care device through usual dental activities may not result in a change in light emitted by the dental care device. Rather, only an unnatural dental care movement may result in a change in light emitted by the dental care device. As such, the criteria of FIG. 7 may reduce the likelihood of a movement of a user of the dental care device unintentionally causing a change in light emitted by the dental care device. Thus, the first and second magnitude thresholds and the time threshold may be set such that only an intentional movement of a user outside of normal dental care movements may result in a change in light emitted by the dental care device. In these and other embodiments, the first and second magnitude thresholds and the time threshold may be set such that a normal adult may be capable of performing the movement.

Figure 8:
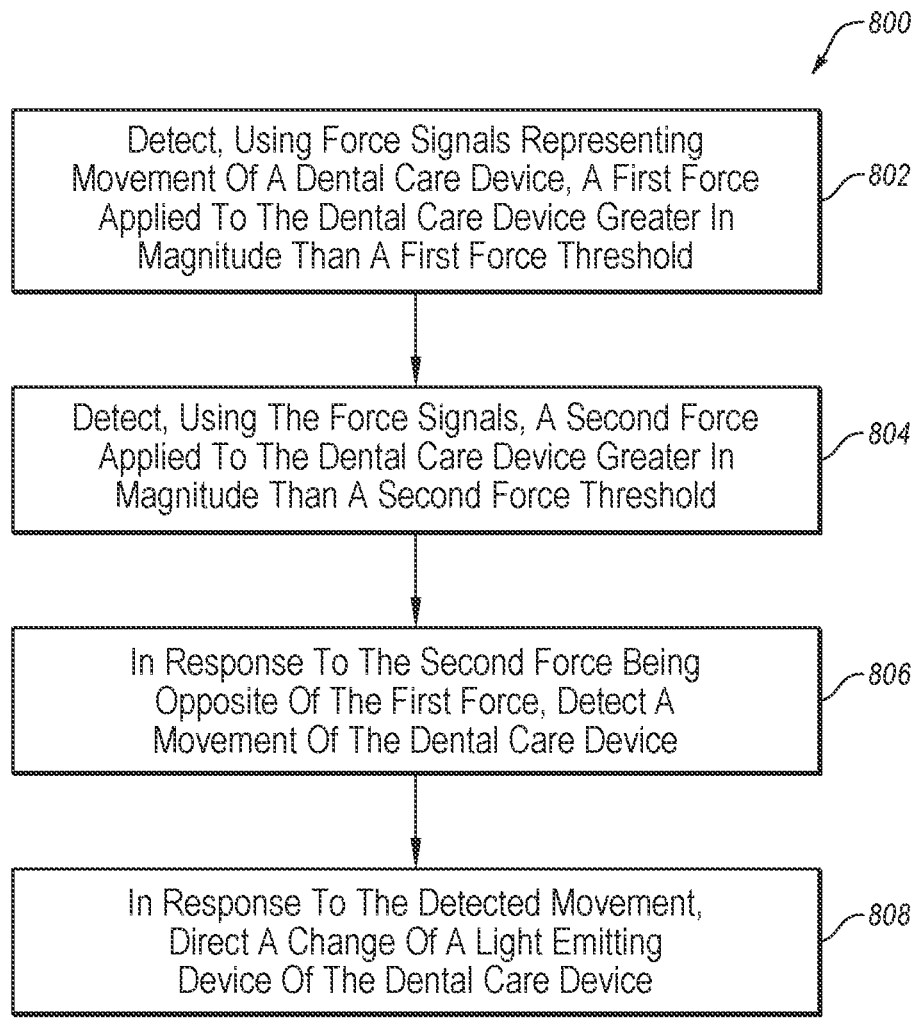
FIG. 8 illustrates a flowchart of another example method of operation of a dental care device.

FIG. 8 illustrates a flowchart of an example method 800 of operation of a dental care device. The method 800 may be arranged in accordance with at least one embodiment described in the present disclosure. One or more operations of the method 800 may be performed, in some embodiments, by a device, such as the dental care device 100 or 300 of FIGS. 1 and 3 or another device, combination of devices, or system. In these and other embodiments, the method 800 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 800 may begin at block 802, where a first force applied to a dental care device greater in magnitude than a first force threshold may be detected using force signals representing movement of a dental care device. At block 804, a second force applied to the dental care device greater in magnitude than a second force threshold may be detected using the force signals.

At block 806, in response to the second force being opposite of the first force, a movement of the dental care device may be detected. In some embodiments, the movement of the dental care device may be detected in further response to the first force and the second force both occurring in a same sensing axis of the sensor. Alternately or additionally, the movement of the dental care device may be detected in further response to a time differential between occurrences of the first force and the second force satisfying a time threshold. Alternately or additionally, the movement of the dental care device may be detected in further response to the sensing axis, in which the first force and the second force occur, corresponding to the movement. In these and other embodiments, the first force and the second force occurring in a second sensing axis of the sensor that does not correspond to the movement may result in the movement not being detected.

At block 808, in response to the detected movement, a change of a light emitting device of the dental care device may occur.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 800 may further include detect, using the force signals, a third force applied to the dental care device greater than the first force threshold and detect, using the force signals, a fourth force applied to the dental care device greater than the second force threshold. The method 800 may further include in response to the fourth force being opposite of the third force and both the fourth force and the third force occurring in the second sensing axis of the sensor, detect a second movement of the dental care device that is different than the movement of the dental care device. The method 800 may also include in response to the detected movement, direct a second change of the light emitting device that is different than the change of the light emitting device.

As another example, in the method 800 the first force and the second force may occur in a first sensing axis of the sensor. In these and other embodiments, the method 800 may further include detect, using the force signals, a third force applied to the dental care device greater than the first force threshold and select the first force as a first condition force in response to the first force being greater than the third force. The method 800 may also include detect, using the force signals, a fifth force applied to the dental care device greater than the second force threshold, the fifth force being in the second sensing axis of the sensor and select the second force as a second condition force in response to the second force being in a same sensing axis of the sensor as the first condition force instead of selecting the fifth force that is in a different sensing axis of the sensor. The method 800 may further include comparing a direction of the first condition force to a direction of the second condition force. In these and other embodiments, in response to the direction of the first condition force being opposite the direction of the second condition force the movement of the dental care device may be detected.

As indicated above, the embodiments described herein may include the use of a special purpose or general-purpose computer (e.g., the processor 310 of FIG. 3) including various computer hardware or software modules, as discussed in greater detail below. Further, as indicated above, embodiments described herein may be implemented using computer-readable media (e.g., the memory 320 of FIG. 3) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A dental care device comprising:
a light emitting device configured to emit light based on a selected function of a plurality of functions and a selected mode of operation for the selected function, each of the plurality of functions including a plurality of modes of operations and the light emitted by the light emitting device is different for each of plurality of modes of operations for each of the plurality of functions, the plurality of functions configured for dental care of a patient;
a sensor configured to output movement signals representing movement of the dental care device; and
at least one processor communicatively coupled to the light emitting device and the sensor, the processor configured to:
determine a first movement of the dental care device based on the movement signals, wherein
in response to the first movement occurring when the light emitting device is not emitting light, the processor is configured to select a mode of a plurality of first modes of a first function of the plurality of functions,
in response to the first movement occurring when the light emitting device is emitting light, the processor is configured to direct the light emitting device to stop emitting light; and
determine a second movement of the dental care device based on the movement signals, wherein
in response to the second movement and the light emitting device emitting light for the first function of the plurality of functions, the processor is configured to direct the light emitting device to stop emitting light,
in response to the second movement and the light emitting device emitting light for a second function of the plurality of functions, the processor is configured to allow the light emitting device to continue emitting light, and
in response to the second movement and the light emitting device not emitting light, the processor is configured to select a mode of a plurality of second modes of the second function of the plurality of functions.

2. The dental care device of claim 1, further comprising:
a first button configured to output a first signal in response to user interaction with the first button; and
a second button configured to output a second signal in response to user interaction with the second button, wherein the processor is communicatively coupled to the first button and the second button and is further configured to:
compare a duration of the first signal to a first threshold, wherein
in response to the light emitting device emitting light and any duration of the first signal, the processor is configured to direct the light emitting device to stop emitting light,
in response to the light emitting device not emitting light and the duration of the first signal being less than the first threshold, the processor is configured to direct the light emitting device to emit light, and
in response to the light emitting device not emitting light and the duration of the first signal being equal to or more than the first threshold, the processor is configured to select a mode of the plurality of first modes of the first function; and
compare a duration of the second signal to a second threshold, wherein
in response to the light emitting device emitting light and any duration of the second signal, the processor is configured to direct the light emitting device to stop emitting light,
in response to the light emitting device not emitting light and the duration of the second signal being less than the second threshold, the processor is configured to direct the light emitting device to emit light, and
in response to the light emitting device not emitting light and the duration of the second signal being equal to or more than the second threshold, the processor is configured to select a mode of the plurality of second modes of the second function.

3. The dental care device of claim 2, wherein the processor is further configured to:
when the first function is selected, direct the light emitting device to stop emitting light after a first time threshold; and
when the second function is selected, direct the light emitting device to stop emitting light after a second time threshold.

4. The dental care device of claim 3, wherein the second time threshold is larger than the first time threshold.

5. A dental care device comprising:
a light emitting device configured to emit light according to a selected light emitting function of a plurality of light emitting functions of operation, the light emitted by the light emitting device being different for each of the plurality of light emitting functions of operation and the plurality of light emitting functions of operation configured for dental care of a patient;
a sensor configured to output movement signals representing movement of the dental care device; and
at least one processor communicatively coupled to the sensor and the light emitting device, the processor configured to perform operations, the operations comprising:
determine a first movement of the dental care device based on the movement signals;
in response to the first movement of the dental care device occurring when the light emitting device has a first status, direct the light emitting device to change operation from a first of the plurality of light emitting functions of operation to a second of the plurality of light emitting functions of operation; and
in response to the first movement of the dental care device occurring when the light emitting device has a second status, direct a change in a status of the light emitting device.

6. The dental care device of claim 5, wherein the status of the light emitting device determines light emission by the light emitting device.

7. The dental care device of claim 6, wherein the light emitting device has the first status when the light emitting device does not emit light and the light emitting device has the second status when the light emitting device emits light.

8. The dental care device of claim 5, wherein the processor being configured to direct the change in the status of the light emitting device includes direct the light emitting device to change to the first status.

9. The dental care device of claim 5, wherein the processor is further configured to direct broadcasting a sound that changes in pitch in response to directing the change in the status of the light emitting device.

10. The dental care device of claim 5, wherein the processor is further configured to direct a change in illumination of a visual indictor in response to directing the change in the status of the light emitting device.

11. The dental care device of claim 5, wherein the processor is further configured to:
  determine a second movement of the dental care device based on the movement signals;
  in response to the second movement of the dental care device and the light emitting device having the first status, select a second function of the operation of the plurality of light emitting functions of operation;
  in response to the second movement of the dental care device and the light emitting device having the second status with respect to a first function, direct the light emitting device to stop emitting light; and
  in response to the second movement of the dental care device and the light emitting device having the second status with respect to the second function, allow the light emitting device to continue emitting light.

12. The dental care device of claim 11, wherein the second movement is in a direction substantially parallel to a direction of a gravitational force of the earth and the first movement is in a direction substantially perpendicular to the direction of the gravitational force of the earth.

13. The dental care device of claim 5, wherein the processor is further configured to:
  when a first function is selected, direct the light emitting device to stop emitting light at a first exposure time; and
  when a second function is selected, direct the light emitting device to stop emitting light at a second exposure time.

14. The dental care device of claim 13, wherein the second exposure time is larger than the first exposure time.

15. The dental care device of claim 5, wherein the directing the light emitting device to change the operation from the first of the plurality of light emitting functions of operation to the second of the plurality of light emitting functions of operation does not result in emission of light by the light emitting device.

* * * * *